US006311116B1

(12) United States Patent
Lee

(10) Patent No.: US 6,311,116 B1
(45) Date of Patent: Oct. 30, 2001

(54) APPARATUS AND METHOD OF PREVENTING SUDDEN ACCELERATION OF VEHICLE

(76) Inventor: Soo Sung Lee, 3ga-101, Choungsan Villa, 527-300, Myonmok-dong, Joongrang-ku, Seoul (KR)

( * ) Notice: Subject to any disclaimer, the term of this patent is extended or adjusted under 35 U.S.C. 154(b) by 0 days.

(21) Appl. No.: 09/593,778
(22) Filed: Jun. 14, 2000
(30) Foreign Application Priority Data Jun. 15, 1999 (KR) .................................................. 99-22208
Nov. 30, 1999 (KR) .................................................. 99-53938

(51) Int. Cl.$^7$ ...................................................... G06F 19/00
(52) U.S. Cl. ................................ 701/70; 701/79; 701/93; 701/96; 701/62; 303/121; 477/125
(58) Field of Search .................................. 701/70, 71, 76, 701/79, 93, 96, 97, 301, 62; 192/219, 220; 303/121; 477/92, 94, 125, 904; 188/181 A; 180/197

(56) References Cited

U.S. PATENT DOCUMENTS

| 4,862,362 | 8/1989 | Kurihara et al. ........................ 701/70 |
| 4,942,784 | 7/1990 | Okahara ................................. 74/866 |
| 5,052,531 | 10/1991 | Bota ........................................ 192/4 |

OTHER PUBLICATIONS

JAPIO Abstract for JP 04165159 A.
JAPIO Abstract for JP 57135362 A.
JAPIO Abstract for JP 05141530 A.
JAPIO Abstract for JP 02245474 A.
JAPIO Abstract for USPN 3,869,588.

Primary Examiner—William A. Cuchlinski, Jr.
Assistant Examiner—Yonel Beaulieu

(57) ABSTRACT

An apparatus and method is provided for preventing sudden acceleration of a vehicle having an automatic transmission by detecting the sudden acceleration with use of transmission state information and rpm. A controller determines that sudden acceleration occurs if the rpm abruptly increases within a first reference time when the transmission maintains a stop or park state, output voltage of an accelerator pedal detected by an ACC detecting unit is less than a predetermined level after inputting a start key. In addition, the controller determines the sudden acceleration if the transmission changes to a driving state and the rpm abruptly increases within a second reference time. When the vehicle drives at a high speed, the controller detects sudden acceleration only when the transmission changes by repeatedly counting the rpm. The controller may also be a central processor unit in an engine control unit of the vehicle. Such apparatus and method may brake the vehicle in case of sudden acceleration, so as to prevent an accident caused by the sudden acceleration.

34 Claims, 14 Drawing Sheets

APPARATUS AND METHOD OF PREVENTING SUDDEN ACCELERATION OF VEHICLE

BACKGROUND OF THE INVENTION

1. Technical Field

The present invention relates to apparatus and method of preventing sudden acceleration of a vehicle, and particularly to apparatus and method of preventing sudden acceleration of a vehicle having an automatic transmission by braking the vehicle through determining sudden acceleration with use of transmission state and rpm of the vehicle in order to prevent the sudden acceleration

2. Description of the Prior Art

Sudden acceleration is phenomenon that a vehicle accelerates suddenly and unintentionally in which output of an engine thereof reaches at 5,000 to 7,000 rpm within 2 or 3 seconds when changing a lever of the automatic transmission from a neutral position N or a parking position P to a drive position D or a reverse position R. Therefore, in such sudden acceleration phenomenon, after the engine firstly outputs 5,000 to 7,000 rpm when changing the lever from N or P to D or R, the output is then transmitted to a disk, which make the vehicle accelerated suddenly. At this time, the output of the engine is initially reduced to 2,500 to 3,500 rpm, however then abruptly increased to 5,000 to 7,000 rpm in a less time than an ordinary case using an accelerator. This makes the vehicle experience immerse acceleration and increase its speed suddenly, which is called "sudden acceleration".

Recently, such sudden acceleration and related accidents appear more frequently, and thus attracts more interest. Therefore, various experiments for tracing the origin of the problem such as an electromagnetic interference EMI noise has been undertaken in national and private laboratories. However, anyone has not cleared up the cause.

SUMMARY OF THE INVENTION

The present invention is designed to overcome the above problems, and an object of the invention is to provide apparatus and method of preventing sudden acceleration of a vehicle, which brake the vehicle in order to prevent the sudden acceleration when the vehicle reaches at a predetermined rpm in a predetermined time in case of starting or restarting the vehicle.

Another object of the present invention is to provide apparatus and method of preventing sudden acceleration of a vehicle, which brake the vehicle in order to prevent the sudden acceleration when the vehicle reaches at a predetermined rpm in a predetermined time in case of starting or restarting the vehicle, and in addition preventing sudden braking in case of running the vehicle in a high speed.

In order to perform the above object, the present invention provides an apparatus for preventing sudden acceleration of a vehicle comprising: start key input detecting means for detecting input of a start key; rpm detecting means for detecting rpm; transmission change detecting means for detecting change of a transmission; ACC detecting means for detecting acceleration inputted through an accelerator pedal; control means for recognizing inputs from the start key input detecting means, the rpm detecting means, the transmission change detecting means and the ACC detecting means, determining sudden acceleration as a result of the recognition, and then outputting control signals for braking an engine and locking/releasing a brake; engine power blocking means for blocking power supply toward the engine according to the engine power blocking control signal from the control means; and brake locking means for locking/releasing a brake motor according to the brake locking/releasing control signals from the control means.

In the apparatus, the control means may determine sudden acceleration when the rpm is abruptly increased at an initial start within a first reference time in case that the transmission change detecting means does not detect a transmission change signal from N or P to D or R and the ACC detecting means detects that the inputted acceleration through the accelerator pedal is less than a reference voltage.

In the apparatus, the control means determines sudden acceleration when the rpm is abruptly increased within a second reference time stored in the control means in case that the transmission change detecting means detects a transmission change signal from N or P to D or R after input of a start key.

In the apparatus, the control means determines sudden acceleration according to the outputs from the rpm detecting means and the ACC detecting means when the transmission changes from N or P to D or R, and does not detect the rpm when the vehicle is driving.

In the apparatus, the engine power blocking means comprises a switching transistor, turning ON according to the engine power blocking control signal from the control means; and a relay for blocking power supply toward the engine when the transistor turns ON.

In the apparatus, the engine power blocking means comprises a motor unit having a brake motor for braking the vehicle; a braking power supply unit for supplying power to the brake motor for locking the brake according to the brake locking control signal from the control means; and a brake releasing power supply unit for supplying power to the brake motor for releasing the brake according to the brake releasing control signal from the control means.

In the apparatus, the brake motor is preferably a reduction motor.

In the apparatus, the motor unit has a steel wire connected to the acceleration pedal, the steel wire being reeled around a drum fixed to a shaft of the motor, through a roller fixed to a bottom of a body of the vehicle, in order to brake the vehicle.

In the apparatus, the motor unit exerts braking force by pushing a hydraulic brake in the brake unit with use of a support member rotatably fixed to a body of the vehicle when the brake motor rotates clockwise, and exerts releasing force by drawing the hydraulic brake with use of the support member when the brake motor rotates counterclockwise.

In the apparatus, the motor unit exerts braking or releasing force by pushing or drawing a hydraulic brake in the brake unit with use of a rod rotatably connected to a shaft of the brake motor, the rod being movable right/left according to clockwise or counterclockwise rotation of the brake motor.

In the apparatus, the braking power supply unit comprises a switching transistor, turning ON according to the brake locking control signal from the control means; and a relay for locking the brake motor by supplying power to the brake motor when the transistor turns ON.

In the apparatus, the braking power supply unit comprises a switching transistor, turning ON according to the brake locking control signal from the control means; and a relay for releasing the brake motor by supplying reverse power to the brake motor when the transistor turns ON.

In order to achieve the above object, the present invention provides a method of preventing sudden acceleration of a vehicle comprising first process of determining whether the transmission changes from a stop state to a driving state, determining that there is no sudden acceleration in case that rpm of the vehicle is not abruptly increased within a first reference time when the transmission is in the stop state, determining that there is sudden acceleration in case that the rpm is abruptly increased with an input voltage of an accelerator under a reference voltage when the transmission is in the stop state, and locking a brake of the vehicle; and second process of determining sudden acceleration again and whether or not to lock the engine and the brake on consideration of a transmission state, a rpm and an acceleration input in case that the first process determines that there is no sudden acceleration In the method, the first process comprises the steps of comparing first and second reference rpm reaching times with the first reference time when the transmission is in the stop state, the first reference rpm and the second reference rpm being set for determining sudden acceleration; proceeding to the second process in case that the first reference time is less than the first and second reference rpm reaching times, and determining whether the accelerator input voltage is less than the reference voltage in case that the first reference time is not less than the first and second reference rpm reaching times; proceeding to the second process in case that the accelerator input voltage is not less than the reference voltage, and comparing a rpm reaching time from the first reference rpm to the second reference rpm with a third reference time in case that the accelerator input voltage is less than the reference voltage; proceeding to the second process in case that the rpm reaching time from the first reference rpm to the second reference rpm is not less than the third reference time, and determining whether the transmission is in the stop state in case that the rpm reaching time from the first reference rpm to the second reference rpm is less than the third reference time; and proceeding to the second process in case that the transmission is in the stop state, and locking the engine and the brake in case that the vehicle is moving as a result of the determination.

In the method, the second process comprises the steps of determining whether the transmission changes from the stop state to the driving state, then comparing first and second reference rpm reaching times with a second reference time, the second reference time being set for determining sudden acceleration when the transmission changes from the stop state to the driving state, and then repeatedly checking change of the transmission in case that the second reference time is less than the first and second reference rpm reaching times; determining that an accelerator input voltage is less than a reference voltage for determining sudden acceleration in case that the second reference time is not less than the first and second reference rpm reaching time; proceeding to the first process in case that the acceleration input voltage is not less than the reference voltage, and comparing a rpm reaching time from the first reference rpm to the second reference rpm with a third reference time in case that the acceleration input voltage is less than the reference voltage; proceeding to the first process in case that the rpm reaching time from the first reference rpm to the second reference rpm is not less than the third reference time, and determining whether the transmission is in the stop state in case that the rpm reaching time from the first reference rpm to the second reference time is less than the third reference time; and proceeding to the first process in case that the transmission is in the stop state, and locking the engine and the brake in case that the transmission is not in the stop state.

The method may further comprise third process of determining that there is sudden acceleration in case that the rpm is abruptly increased within a second reference time when the first process detects that the transmission changes from the stop state to the driving state, and then locking an engine and a brake.

In the method, the third process comprises the steps of comparing first and second reference rpm reaching times with a second reference time for determining sudden acceleration; determining that an acceleration input voltage is less than a reference voltage in case that the first and second reference rpm reaching times are not less than the second reference time; comparing a rpm reaching time from the first reference rpm to the second reference rpm with a third reference time in case that the accelerator input voltage is less than the reference voltage, the third reference time being set for determining sudden acceleration when the rpm abruptly increases; checking that the vehicle is moving in case that the rpm reaching time from the first reference rpm to the second reference rpm is less than the third reference time; and locking the engine and the brake in case that the vehicle is moving.

The method may further comprise the steps of releasing the brake during changing the transmission from the stop state to the driving state in case that the brake is locked for shift lock at starting the vehicle; and proceeding to the second process after releasing the brake in case that the first process determines that there is no abrupt increase of the rpm within the first reference time.

For obtaining the above object, the present invention provides another method for preventing sudden acceleration of a vehicle comprising first process of determining whether transmission of a vehicle changes from a stop state to a driving state after starting the vehicle; second process of determining that there is no sudden acceleration in case that abrupt increase of rpm is not detected within a first reference time when the vehicle is in an initial stop state as a result of the determination of the first process, determining that there is sudden acceleration in case that the rpm abruptly increases when an accelerator input voltage is less than a reference voltage even in the stop state, and locking an engine and a brake; and third process of determining sudden acceleration in case that the rpm abruptly increases within a second reference time when the transmission changes from the stop state to the driving state, and locking the engine and the brake.

For accomplishing the above object, the present invention also provides a method for preventing sudden acceleration of a vehicle comprising first process of determining whether transmission of a vehicle changes from a stop state to a driving state after starting the vehicle; second process of determining that there is no sudden acceleration in case that abrupt increase of rpm is not detected within a first reference time when the first process determines that the transmission is in an initial stop state, determining that there is sudden acceleration in case that the rpm abruptly increases when an accelerator input voltage is less than a reference voltage even in the stop state, and locking an engine and a brake; third process of determining sudden acceleration in case that the rpm abruptly increases within a second reference time when the transmission changes from the stop state to the driving state, and locking the engine and the brake; and fourth process for determining sudden acceleration on consideration of a transmission state, a rpm and an acceleration input in case that the second process determines that there is no sudden acceleration, and then determining whether or not locking the engine and the brake.

In order to obtain the above object, the present invention provides another embodiment of an apparatus for preventing sudden acceleration of a vehicle comprising rpm detecting means for detecting rpm in order to determine drive of an engine and sudden acceleration; transmission detecting means for detecting change of a transmission from a stop state to a driving state; sudden acceleration detecting means for detecting sudden acceleration by using outputs of the rpm detecting means and the transmission detecting means; first timing pulse generating means for generating timing pulse according to outputs of the sudden acceleration detecting means; engine power blocking means for blocking power supply from a battery toward the engine according to a timing pulse from the first timing pulse generating means; brake means for braking the vehicle according to the timing pulse from the first timing pulse generating means; brake releasing means for releasing the braking means when the braking means operates abnormally; braking power supply means for supplying braking power from a battery to the braking means according to the timing pulse from the first timing pulse generating means; and sudden braking preventing means connected to the braking power supply means and the brake releasing means in order to prevent sudden acceleration when the vehicle is driving.

BRIEF DESCRIPTION OF THE DRAWINGS

These and other features, aspects, and advantages of the present invention will become better understood with regard to the following description, appended claims, and accompanying drawings, in which like components are referred to by like reference numerals. In the drawings:

DETAILED DESCRIPTION OF THE PREFERRED EMBODIMENT

Hereinafter, preferred embodiments of the present invention will be described in detail with reference to the accompanying drawings.

First Embodiment

Figure 1:
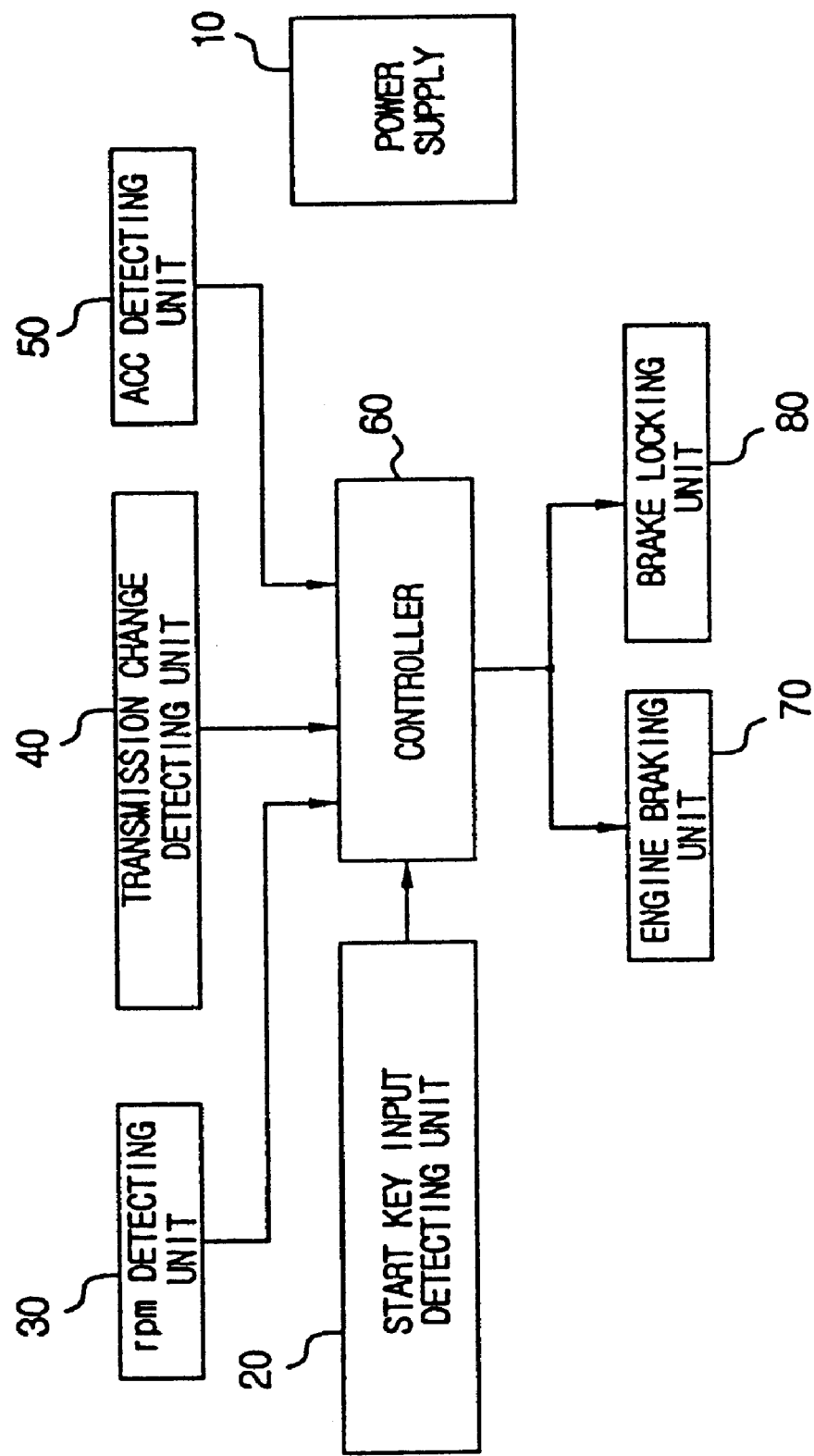
FIG. 1 is a block diagram showing an apparatus for preventing sudden acceleration according to one embodiment of the present invention.

FIG. 1 is a block diagram for showing configuration of a sudden acceleration preventing apparatus according to first embodiment of the present invention. Referring to the figure, the apparatus includes a power supply 10 for supplying power to each unit in the apparatus, a start key input detecting unit 20 for detecting input of a start key, a rpm detecting unit 30 for detecting rpm, a transmission change detecting unit 40 for detecting that a transmission changes from a stop state (such as neutral position N or parking position P) to a driving state (such as drive position D or reverse position R), an ACC detecting unit 50 for detecting acceleration inputted through an accelerator pedal, a controller 60 for determining sudden acceleration with use of information inputted by the units 20, 30, 40 and 50 and then locking an engine and a brake according to the determination, an engine power blocking unit 70 for blocking power supply toward the engine by control of the controller 60 when the sudden acceleration occurs, and a brake locking unit 80 for locking/releasing a brake motor by control of the controller 60 when the sudden acceleration occurs.

Figure 2:
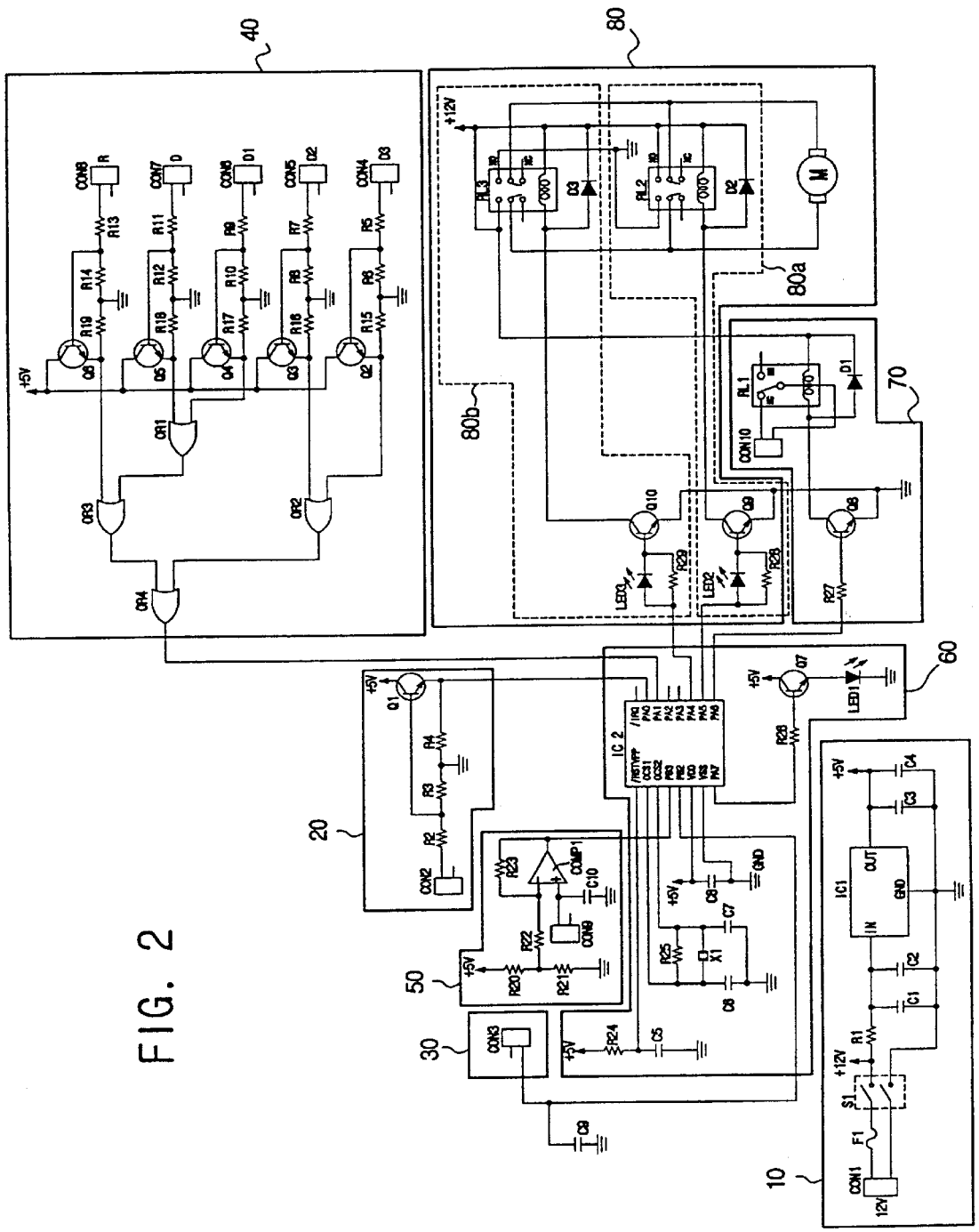
FIG. 2 shows a detailed circuit of FIG. 1.

FIG. 2 shows a detailed circuit of each unit. As shown in the figure, a connector CON1 of the power supply 10 is connected to a DC12V battery when a IG2 switch is ON. The connector CON1 is also connected to a power switch S1 through a fuse F1 which may short-circuit when overcurrent generates due to disorder to the circuit. The power switch S1 is connected to a constant-voltage IC (IC1) for supplying constant voltage to each unit of the apparatus. When the power switch S1 is OFF, the circuit does not operate because there is no power supplied, which is a normal state of a vehicle.

When the power switch S1 is ON, the DC12V voltage is converted into DC5V and then supplied to each circuit through the constant-voltage IC (IC1). A resistor R1 is provided to lower voltage with use of watt resistance for reducing heat generation of the constant-voltage IC (IC1). Condensers C1–C4 are employed to maintain the power stable.

The start key input detecting unit 20 transmits signal generated when the start key for driving a start motor is ON, to the circuit through a connector CON2. Due to voltage difference and possible damage of the controller 60 in case of inputting the signal to the controller 60 directly, the start key input detecting unit 20 employs resistors R2, R3 for lowering voltage and a transistor Q1 for switching the signal, which makes the signal suitable for inputting to the controller 60.

The rpm detecting unit 30 inputs pulses generated corresponding to a rotatory count of the engine, to the controller 60 through a connector CON3. In case that abnormal noise is mixed to an engine rpm detecting pulse during a predetermined time (commonly, 5 seconds) when starting the vehicle with the engine cooled, the unit 30 damps the noise with use of a condenser C9.

The transmission change detecting unit 40 inputs a signal about state of a transmission (e.g. R or D), to the circuit through connectors CON4–CON8 when changing the transmission. For the purpose of solving problems of voltage difference and damage of the controller 60 which may occur when inputting the signal directly to the controller 60, the transmission change detecting unit 40 lowers voltage with use of resistors R5–R14, switches and inputs the signal to an OR gates OR1–OR3 with use of each base of transistors Q2–Q6, inputs output of the OR gates OR1–OR3 to an OR gate OR4 and inputs output of the OR gate OR4 about R or D state to the controller 60. If information about the D or R state is not inputted, the controller 60 considers the transmission in N or R state.

The ACC detecting unit 50 detects a predetermined level of acceleration from the accelerator ACC by inputting a DC0V–DC5V signal through a connector CON9 to a non-inverting input end (+) of a comparator COMP1, and then inputs a detected signal to the controller 60. The ACC detecting unit 50 also has a condenser C10 for damping noise.

The controller 60 includes a timer (65.5 msec) for counting number of rpms. With use of the counter, the controller 60 determines that the sudden acceleration occurs in case that the rpm abruptly increases within a predetermined time (e.g. 5 seconds) on condition that the transmission is in N or P and the accelerator pedal is not so pressed to be a predetermined rpm (e.g. 4200 rpm), that is, an output voltage of the ACC detecting unit 50 is less than a predetermined voltage (e.g. 1.0 V), after inputting the start key. The controller 60 also determines that the sudden acceleration occurs in case that the rpm abruptly increases within a predetermined time (e.g. 3 seconds) when detecting change of the transmission to D or R within a predetermined time (e.g. 5 seconds) after inputting the start key. Preferably, the controller 60 determines that the sudden acceleration occurs if the rpm reaches from 2400 rpm to 4200 rpm within 1.2 seconds. When driving the vehicle, the controller 60 does not detect rpm except the case of changing the transmission from N or P to D or R. In such case, the controller 60 determines sudden acceleration by repeatedly counting the rpm number during a predetermined time (e.g. 3 seconds) when detecting change of the transmission from N or P to D or R. At this time, a microprocessor IC2 of the controller 60 receives output signals of the start key input detecting unit 20, the rpm detecting unit 30, the transmission change detecting unit 40 and the ACC detecting unit 50 through input ports PA0, PB2, PA1, PB3. The microprocessor IC2 also outputs control signals for blocking power toward the engine and locking/releasing the brake through output ports PA4–PA6. With use of the control signals, the controller 60 controls the engine power blocking unit 70 and the brake locking unit 80 to be braked, and displays their state with use of light emitting diode LED1. That is, the light emitting diode LED1 is for displaying whether the apparatus operates normally and emits light for a predetermined time when starting or changing the transmission.

In addition, the controller 60 makes use of output of the ACC detecting unit 50 in order to determine sudden acceleration as follows.

Output voltage of the accelerator is detected in range of 0.2V–5V in the Engine Control Unit (ECU), which is proportional to pressure exerted on the accelerator pedal. Sudden acceleration may occurs without stepping on the accelerator pedal after starting the vehicle, but in some cases, a driver may press the accelerator pedal more or less after the sudden acceleration occurs. In such case, unintended sudden acceleration and driver-oriented acceleration occur at the nearly same time though there may be a time difference.

At this time, in order to distinguish that abrupt increase of the rpm is caused by the driver-oriented acceleration or the unintended sudden acceleration, proportional relation between the output voltage of the accelerator and the rpm of the engine may be taken into consideration.

Output voltage of the accelerator for reaching at 4200 rpm may be possible under at least 1.0V. On the basis of 1.0V of the accelerator output voltage, the accelerator pedal is pressed in depth of about 50–60% to make 4200 rpm. Maximum output of the engine is 4200 rpm at 1.0V and 6000 rpm at 1.43V. Therefore, if increase of the rpm is detected together with 1.0V of the accelerator output voltage, the acceleration is considered as a driver-oriented acceleration. However, if there is a sufficient time difference between times of detecting the accelerator output voltage and the increase of the rpm, it may be considered as a sudden acceleration.

Therefore, that the rpm of the engine increases proportional to and along with the output voltage of the accelerator pedal is considered as an intended acceleration, that is, a normal driving state. However, if the rpm of the engine and the output voltage of the accelerator pedal increase with a time difference or the rpm of the engine increases even without stepping on the accelerator pedal, the controller 60 determines that the sudden acceleration occurs and then locks the engine and the brake.

The controller 60 may determine sudden acceleration in another manner. After memorizing variation process of the accelerator output voltage in a separate programmable IC, the controller 60 compares the memorized variation process with input of the rpm detecting unit 30. If they are proportional, the controller 60 determines that it is normal, while, if they are not proportional or has a time difference, the controller 60 determines that the sudden acceleration occurs. At this time, determination of the controller should be based on 4200 rpm. It is because the sudden acceleration makes at least 4200 rpm.

The engine power blocking unit 70 includes a transistor Q8 which turns ON when the controller 60 outputs a control signal for braking the engine, and a relay RL1 for blocking power supply toward the engine when the transistor Q8 turns ON. If the controller 60 detects sudden acceleration and outputs a control signal for braking the engine to an output port PA6 during a predetermined time (about 3 seconds), the control signal is applied to a base of the transistor Q8 through a resistor R27, which makes the transistor turn ON. That makes DC12V flowed in a coil of the relay RL1, contact point of a NC shorted, and then power supply toward the engine blocked, which brakes the engine. In the figure, a diode D1 is for preventing backward current and a connector CON10 is connected to the engine.

The brake power blocking unit 80 includes a motor unit having a brake motor M for braking the vehicle, a braking power supply unit 80A for supplying power for braking the brake motor M according to the brake locking control signal from the controller 60, and a brake releasing power supply unit 80B for supplying power for releasing the brake motor M according to the brake releasing control signal from the controller 60.

The braking power supply unit 80A includes a transistor Q9 which turns ON according to the control signal for locking the brake outputted from the controller 60 at time of sudden acceleration, and a relay RL2 for locking the brake motor M by supplying forward power to the brake motor M when the transistor Q9 turns ON. The brake releasing power supply unit 80B includes a transistor Q10 which turns ON when the controller 60 outputs the control signal for releasing the brake motor M, and a relay RL3 for releasing the brake motor M by supplying backward power to the brake motor M when the transistor Q10 turns ON. Light emitting diodes LED2, LED3 are provided to display the fact that the controller 60 outputs the brake locking control signal and the brake releasing control signal.

Figure 3:
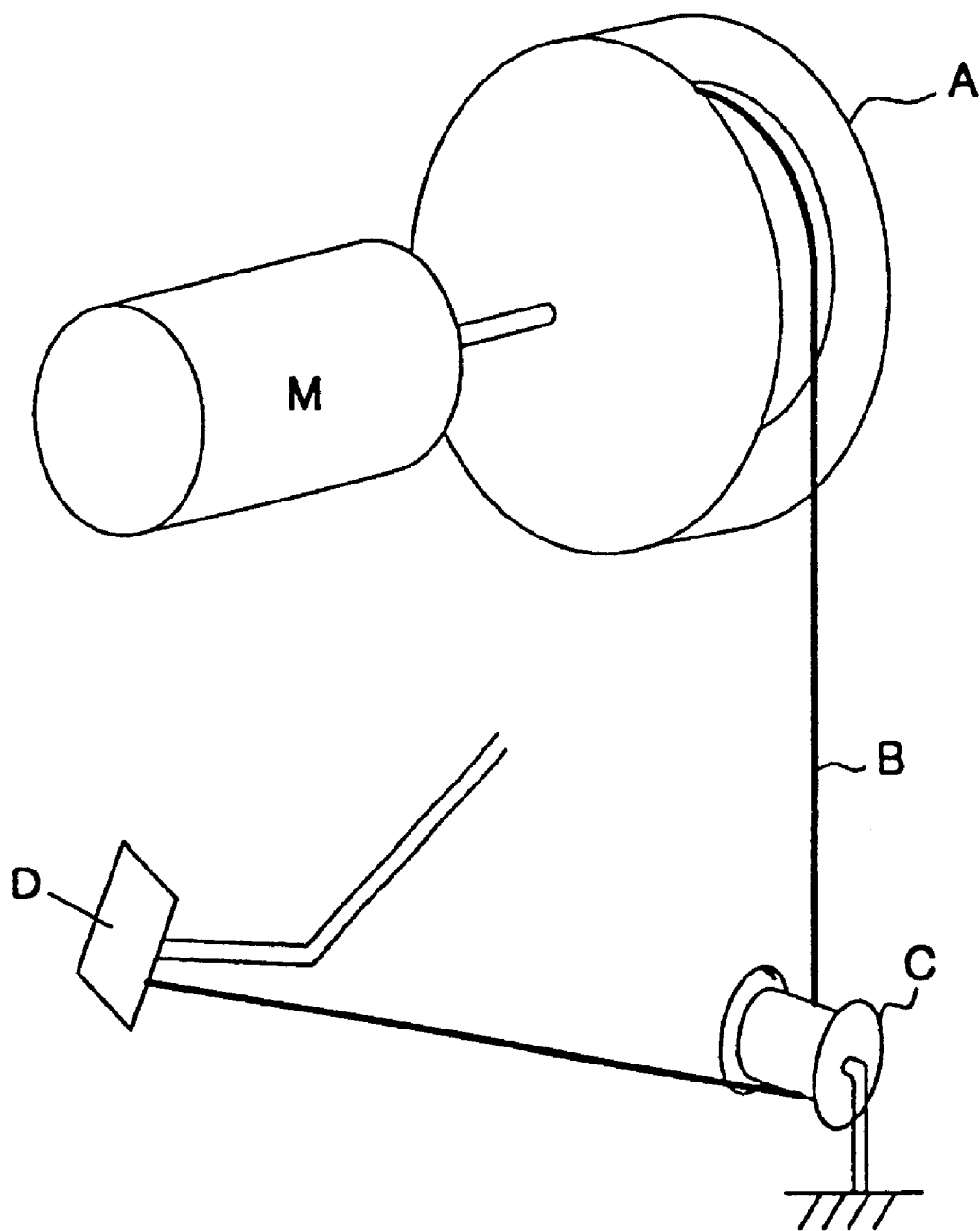
FIGS. 3, 4 and 5 show various examples of a brake motor in FIG. 2.

In addition, the brake motor M of the brake locking unit 80 may be a reduction motor (30 rpm). The motor unit having the brake motor M is configured that a steel wire B connected to a brake pedal D wraps a drum A having a cylindrical plate fixed to a shaft of the brake motor M, through a roller C fixed to a bottom of a body E of the vehicle, as shown in FIG. 3. The drum A preferably has a diameter of 4.2 cm and an inner circumference of 13.85 cm. When the brake locking control signal is outputted from the controller in case of sudden acceleration, the brake motor M rotates during a predetermined time (e.g. 1.5 seconds) in order to reel the steel wire B around the drum A, then stops during a predetermined time (e.g. 0.5 seconds), and then rotates backward in order to reel out the steel wire, which makes the brake released.

In such brake locking unit 80, if the controller 60 detects sudden acceleration and outputs the brake locking control signal to an output port PA5 during a predetermined time (about 1.5 seconds), the signal applied to a base of the transistor Q9 through a resistor R28, which makes the transistor Q9 turn ON. Therefore, the transistor Q9 flows DC12V on a coil of the relay RL2 so to be connected to a NO contact, which supplies forward power to the brake motor M. Then, the brake motor M is driven at DC12V and reels the steel wire B to draw the brake pedal D and lock the brake. After a predetermined time, the controller 60 stops output of the brake locking control signal. That is, the controller 60 makes the output port PA5 be Low.

In addition, the output port PA4 outputs the brake releasing control signal through a resistor 29 such that a transistor Q10 turns ON. When the transistor Q10 turns ON, DC12V flows on a coil of the relay RL3 so to be connected to a NO contact. Then the relay RL3 supplies backward power (DC12V) to the brake motor M in order to reel out the steel wire B and recover the brake pedal D to its initial position.

On the other hand, as another embodiment of the motor unit, the brake locking unit 80 may press a hydraulic brake with use of a reduction motor in order to make clean appearance by not exposing the steel wire externally. Such embodiment may employ an electric automatic control method, and is depicted in FIG. 5.

Figure 4:
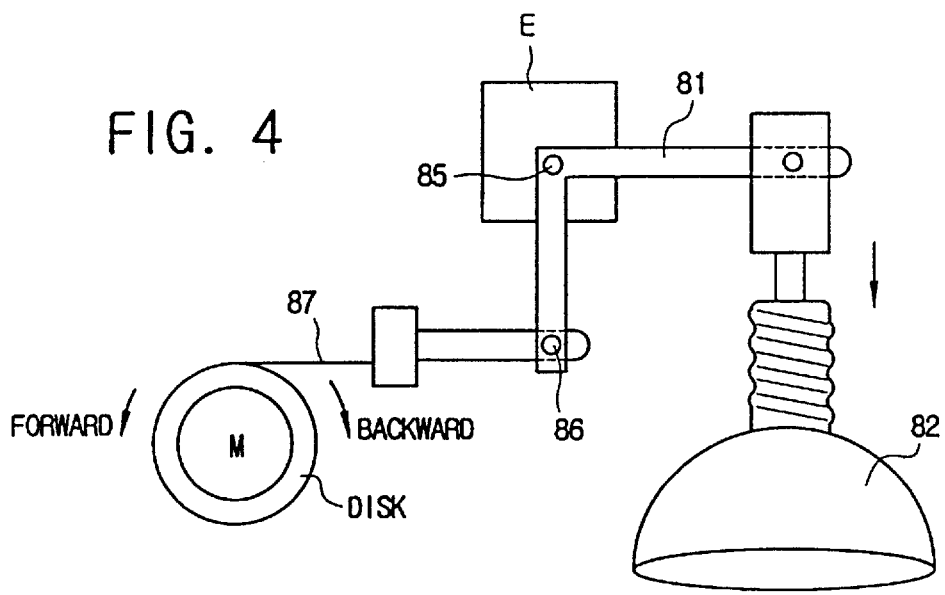

Referring to FIG. 4, when the brake motor M rotates forward, a support member 81 rotatably fixed to the body E of the vehicle pushes the hydraulic brake 82 to a direction shown by an arrow in order to brake the vehicle. At this time, the steel wire 87 is drawn by the brake motor M and then reeled around the drum. When the drive motor M rotates backward, the hydraulic brake 82 is drawn to a direction opposite to the arrow so to release the brake. Unexplained reference number 86 designates a connecting pin.

Figure 5:
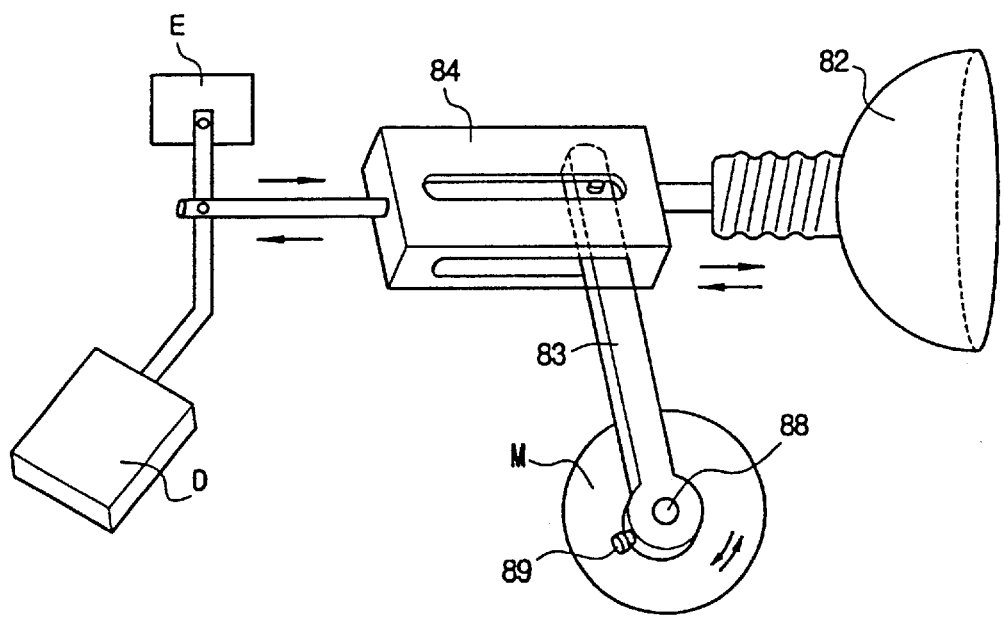

Referring to FIG. 5, when the brake motor M rotates forward, a rod 83 rotatably connected to the shaft 88 of the brake motor M slides right along an elongated guide hole formed along length of a driver 84 in order to push the hydraulic brake 82 to be locked. When the brake motor M rotates backward, the rod 83 slides along the elongated guide hole of the driver 84 in order to draw the hydraulic brake 82 to be released. Unexplained reference number 89 is a shaft fixing screw.

Figure 6:
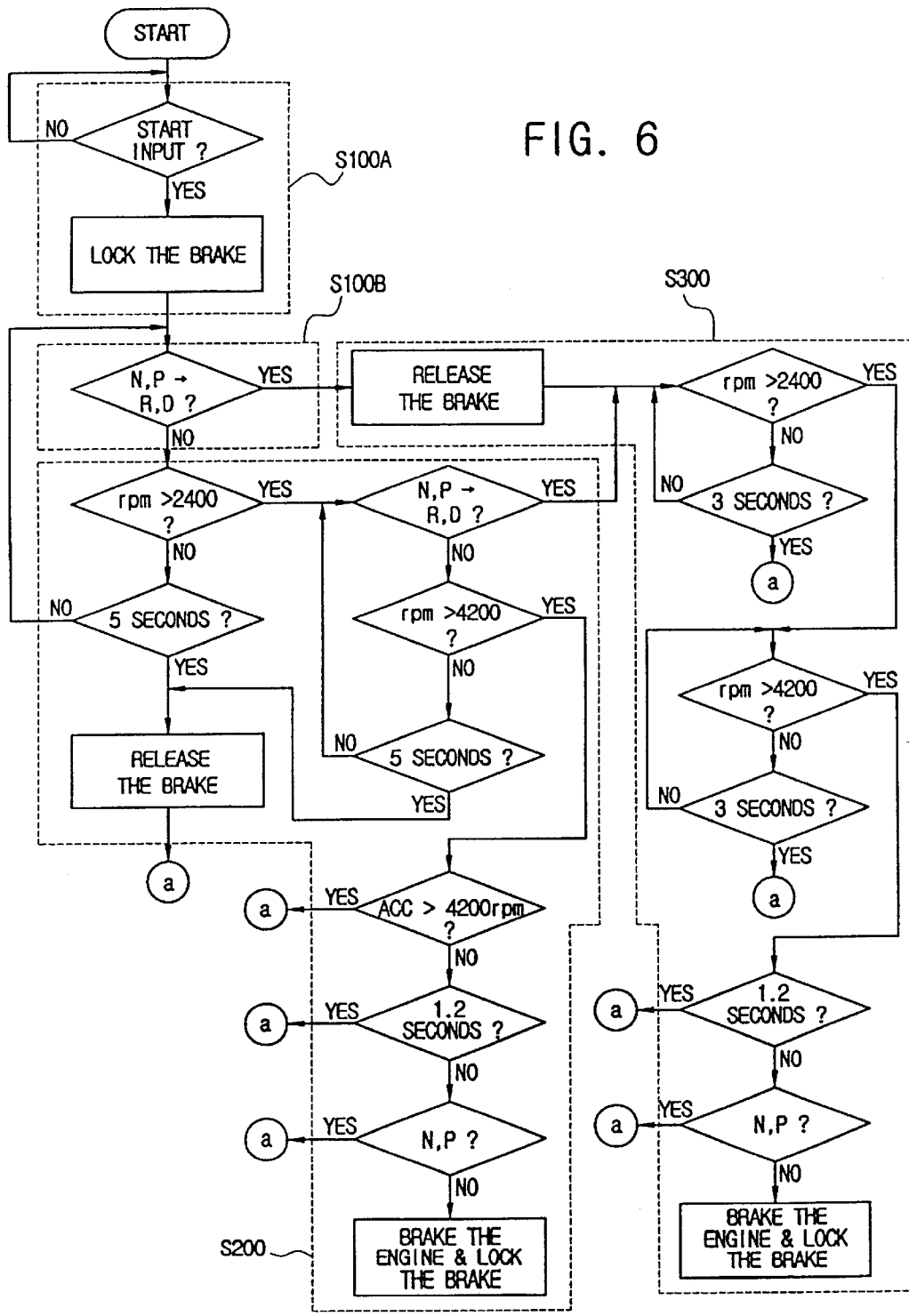
FIGS. 6 and 7 are flow charts for illustrating overall operation of the sudden acceleration preventing apparatus of the prevent invention.
Figure 7:
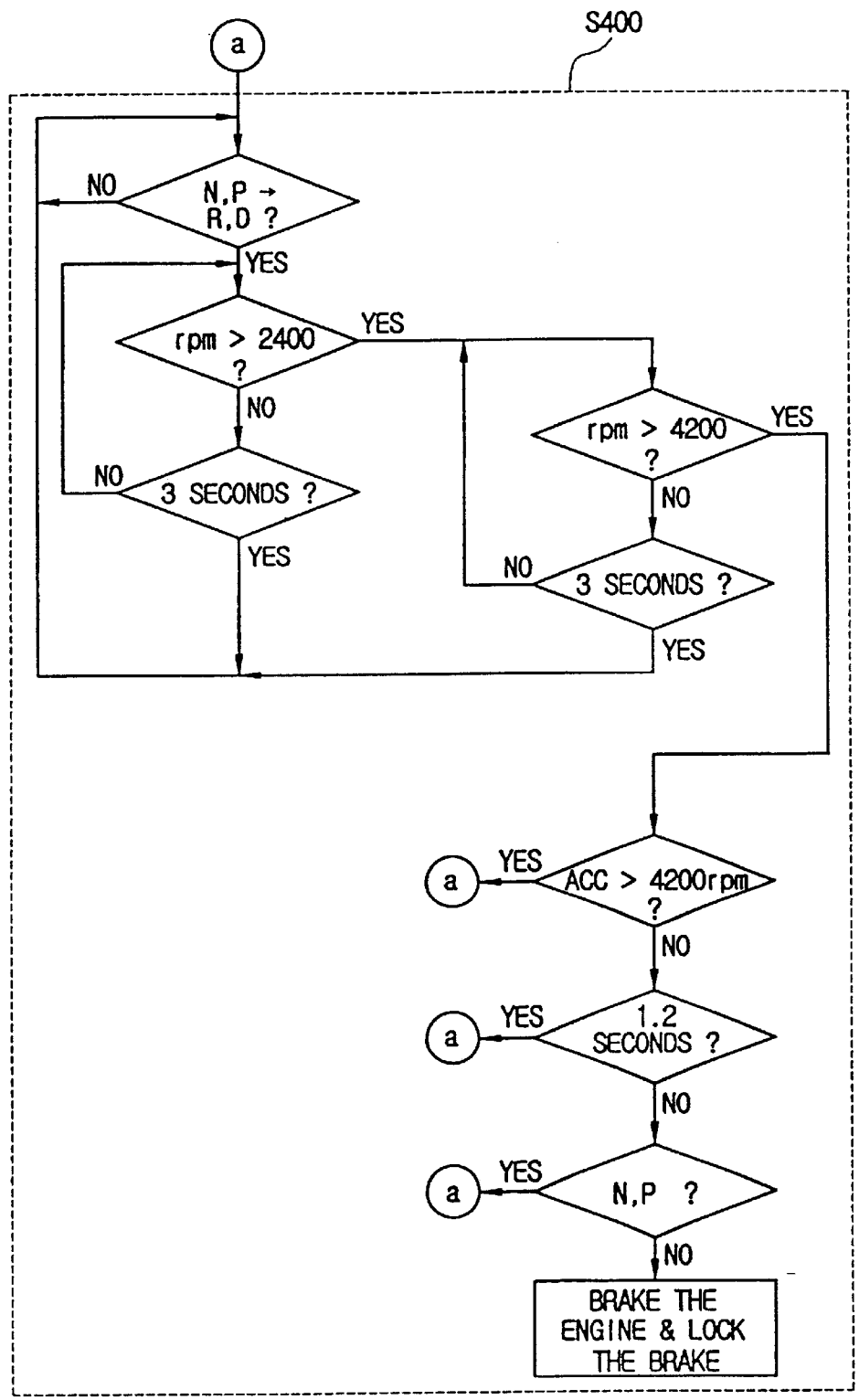

FIG. 6 and FIG. 7 shows overall procedure of a sudden acceleration preventing method according to the present invention. As shown in the figures, the method roughly includes a step of locking the brake for shift lock when inputting the start key S100A, a step of determining whether the transmission changes from N or P to D or R when inputting the start key S100B, a controlling step when the transmission is in N or P at initially starting the vehicle S200, a controlling step when the transmission changes from N or P to D or R after starting the vehicle S300, and a controlling step when the transmission changes to D or R when driving the vehicle S400.

Figure 8:
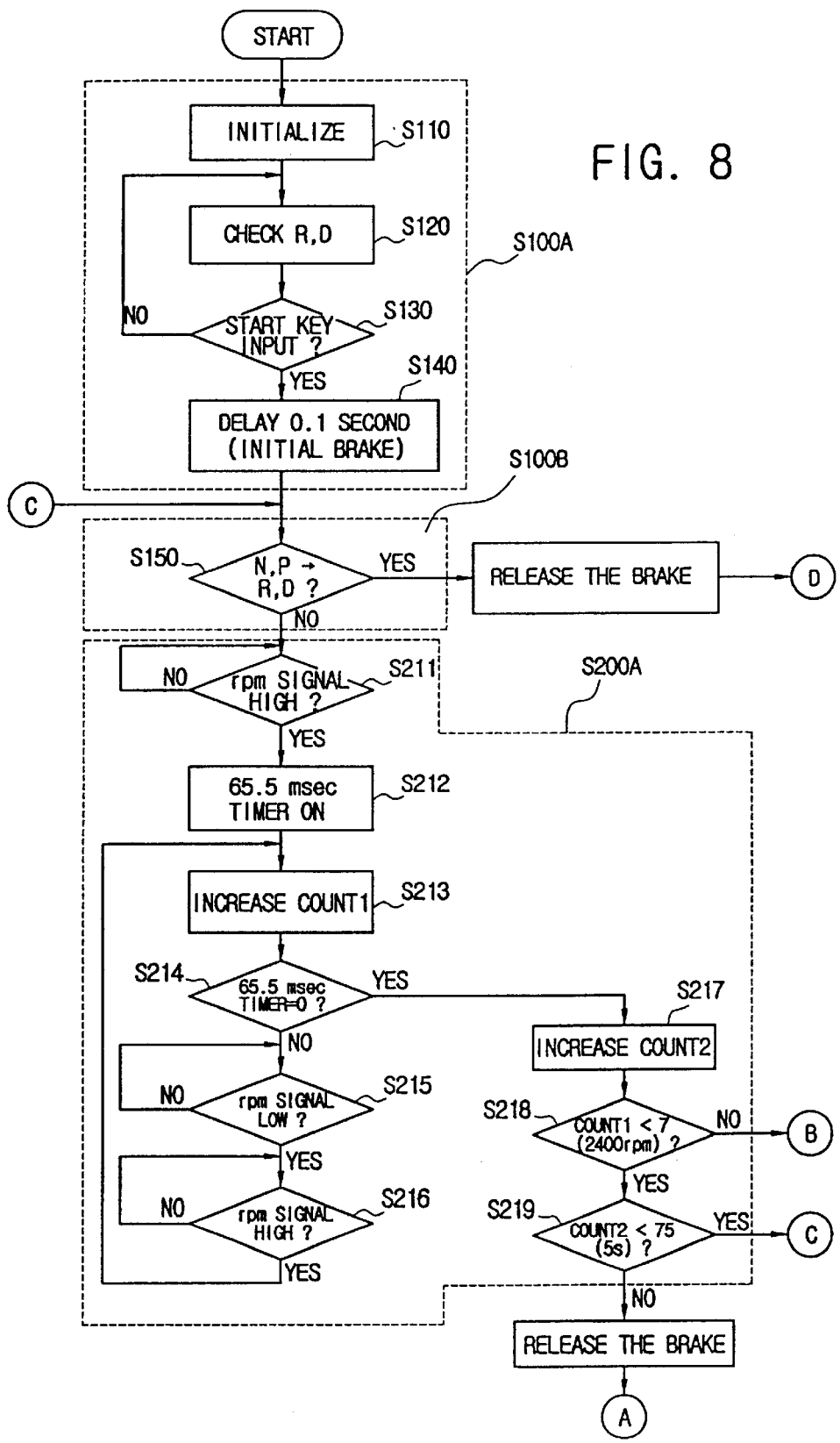
FIGS. 8 and 9 are detailed flow charts for illustrating a brake locking process at input of a start key and a control process in a stop state such as N or P at an initial start.

The step S100A, as shown in FIG. 8, includes steps of initializing the system (timer and every counter) S110, checking D or R state of the transmission S120, determining whether the start key is inputted S130, and delaying the start key input (for 0.1 second) in order to prevent system errors when inputting the start key, and locking the brake S140. At this time, locking the brake is for preventing the vehicle from moving without intention of the driver. Therefore, the present invention may have a function of automatic shift lock though the driver does not step on the brake pedal.

Figure 9:
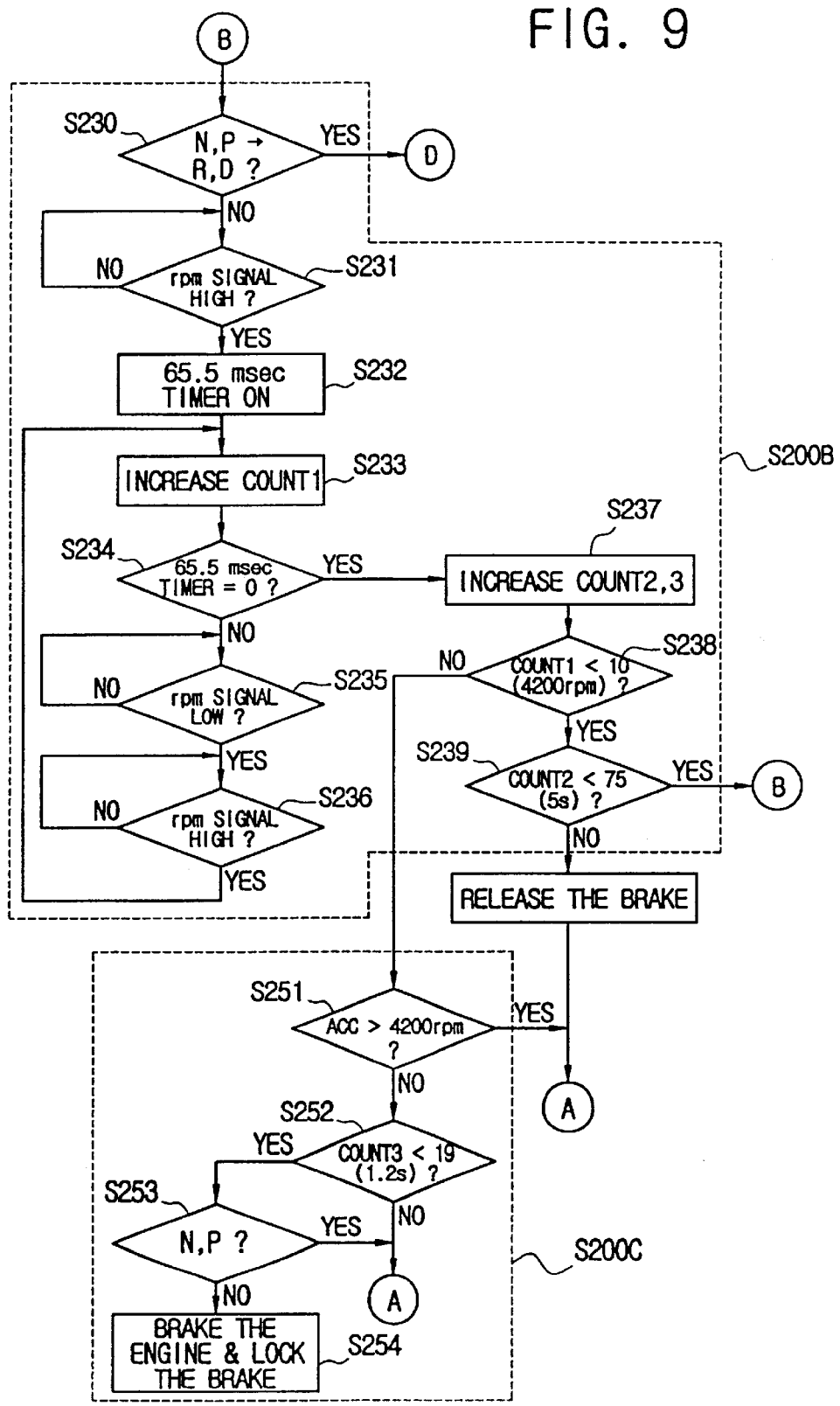

The step S200, well shown in FIG. 8 and FIG. 9, includes steps of checking 2400 rpm S200A, checking 4200 rpm S200B, and braking the engine S200C.

The 2400 rpm checking step S200A includes steps of determining whether the rpm signal is High when the transmission is in N or P state after determining that the transmission changes from N or P to D or R S211, making the timer (65,6 msec) ON by the controller 60 when the rpm signal is High S212, and increasing a counting value of the counter COUNT1 which counting rpm pulses S213. Then, the step S200A proceeds to steps of determining whether value of the timer is zero S214, determining whether the rpm signal is High or Low when the timer value is not zero S215, 216, and increasing value of the counter COUNT1 when the rpm signal changes from Low to High S213. In case that the timer value is zero in the step S214, the 2400 rpm checking step S200A executes a step of increasing value of a counter COUNT2 which counts a value corresponding the a first reference time (e.g. 5 seconds) S217. The first reference time is previously set in the controller 60 for determining sudden acceleration. The present invention employs the 65.5 msec timer, and the 65.5 msec timer counts 75 times for 5 seconds. Therefore, the counter COUNT2 is set to count 75 times for 5 seconds. Then, the step S200A proceeds to steps of determining whether the value of the counter COUNT1 reaches at 2400 rpm S218, comparing the value of the counter COUNT2 with a value of the first reference time (75: hereinafter just referred to first reference time) when the value of the counter COUNT1 is less than 2400 rpm S219, and then releasing the brake locked in the step S100A in case that the value of the counter COUNT2 is not less than the first reference time.

At this time, the counter COUNT1 is for counting 2400 rpm and 4200 rpm in order to determine sudden acceleration, and therefore counts 7 pulses corresponding to 2400 rpm and 10 pulses corresponding to 4200 rpm.

The 7 pulses corresponding to 2400 rpm and the 10 pulses corresponding to 4200 rpm are described in more detail. Because the present invention employs the 65.5 msec timer for counting the rpm in the controller 60, numbers of pulses corresponding to 2400 rpm and 4200 rpm are 6 and 9 in real at the 65.5 msec. In fact that the present invention requires a time to reach at 2400 rpm and 4200 rpm, the 7 pulses at the moment of exceeding 2400 rpm and the 10 pulses at the moment of exceeding 4200 rpm are used for determining sudden acceleration.

If the value of the counter COUNT1 is not less than 7 corresponding to 2400 rpm, the step S200A proceeds to the 4200 rpm checking step S200B, while, if the value of the counter COUNT2 is less than the first reference time, the 2400 rpm checking step S200A is repeated.

The 4200 rpm checking step S200B includes steps of determining whether the transmission changes from N or P to D or R S230, and determining whether the rpm signal is High when the transmission maintains N or P S231. If the rpm signal is High, the controller 60 makes the timer (65.5 mesc) ON S232, and increases a counting value of the counter COUNT1 S233. Then, the step S200B executes steps of determining whether the value of the timer is zero S234, determining whether the rpm signal is Low or High if the value of the counter is not zero S235, S236, and then increasing the value of the counter COUNT1 if the rpm signal changes from Low to High S233. Such procedure is similar with the 2400 rpm checking step S200A.

Besides, if the value of the timer becomes zero, the step S200B increases a value of the counter COUNT2 and a value of a counter COUNT3 for counting value corresponding to a third reference time (1.2 seconds) S237. The third reference time is previously set in the controller 60 for determining sudden acceleration in case that the rpm abruptly increases. Because the present invention employs the 65.5 msec timer, the 65.5 msec timer should count 19 times for 1.2 seconds. Therefore, the counter COUNT3 is to count 19 times for reaching at 1.2 seconds. The step S200B then proceeds to steps of comparing the value of the counter COUNT1 with 10 corresponding to 4200 rpm S238, and comparing the value of the counter COUNT2 with the first reference time if the value of the counter COUNT1 is less than 10 S239. If the value of the counter COUNT2 is less than the first reference time, the 4200 rpm checking step S200B is repeated. If the value of the counter COUNT2 is not less than the first reference time, the brake locked in the step S100A is released.

If the value of the counter COUNT1 is not less than 10 corresponding to 4200 rpm, the method executes the engine braking step S200C. The step S200C includes steps of determining whether the accelerator pedal is pressed excessively than 4200 rpm S251. In other words, the step S251 determines whether output voltage detected in the ACC detecting unit 50 is not less than 1.0V corresponding to 4200 rpm. If the pedal is pressed not less than 4200 rpm, the step 251 proceeds to the step S400. If the pedal is pressed less than 4200 rpm, the step S200C executes step of comparing the value of the counter COUNT3 with a value corresponding to the third reference time (19; hereinafter referred to third reference time) S252.

If the value of the counter COUNT3 is not less than the third reference time as a result of the comparison, the step S252 proceeds to the step S400. If the value of the counter COUNT3 is less than the third reference time, the step S200C executes steps of determining whether the transmission is N or P S253, and braking the engine and locking the brake if the transmission is not N or P S254. If the transmission is N or P, the step S253 proceeds to the step S400.

Figure 10:
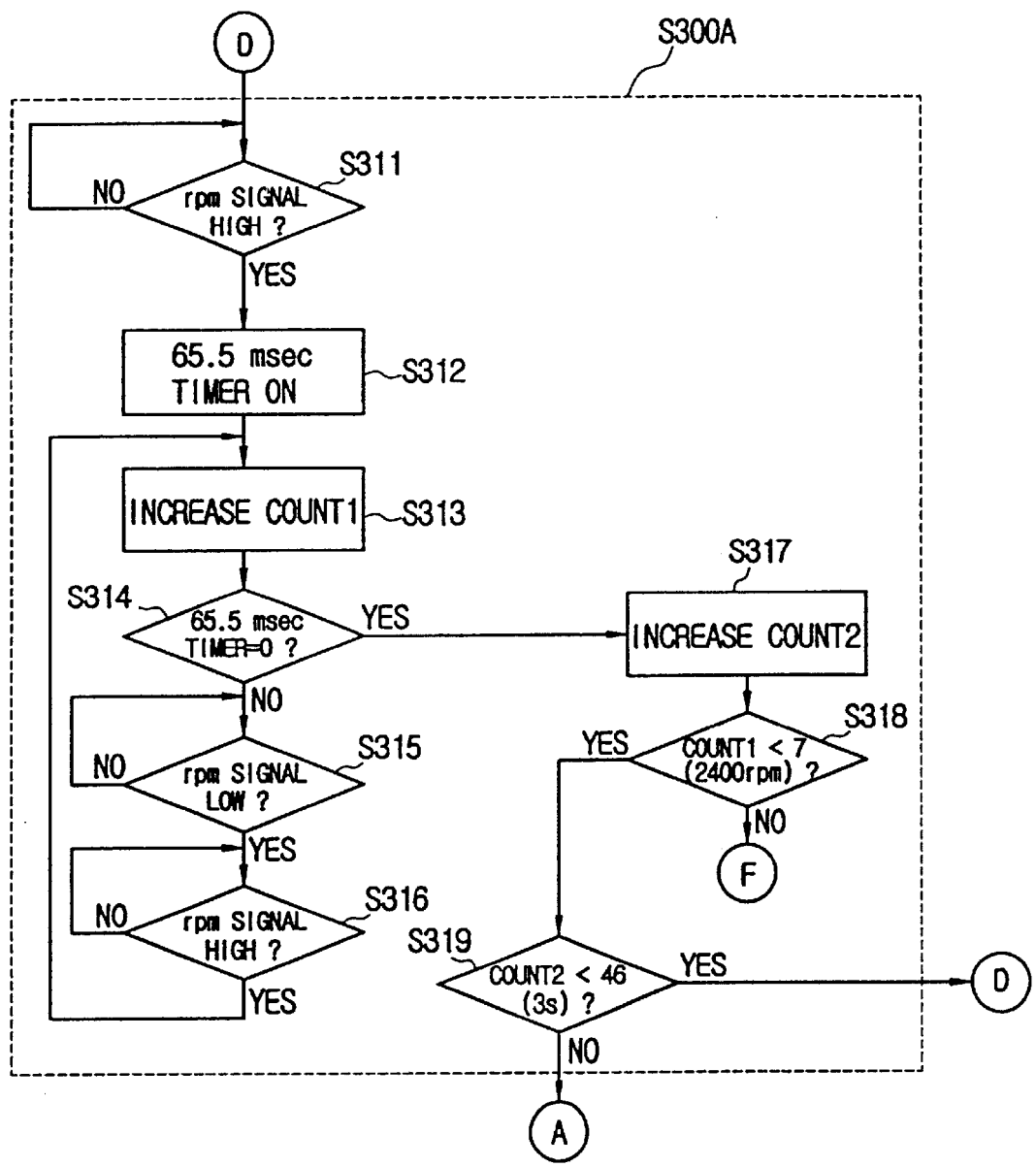
FIGS. 10 and 11 are detailed flow charts for illustrating a control process when transmission changes from N or P to D or R after the initial start.
Figure 11:
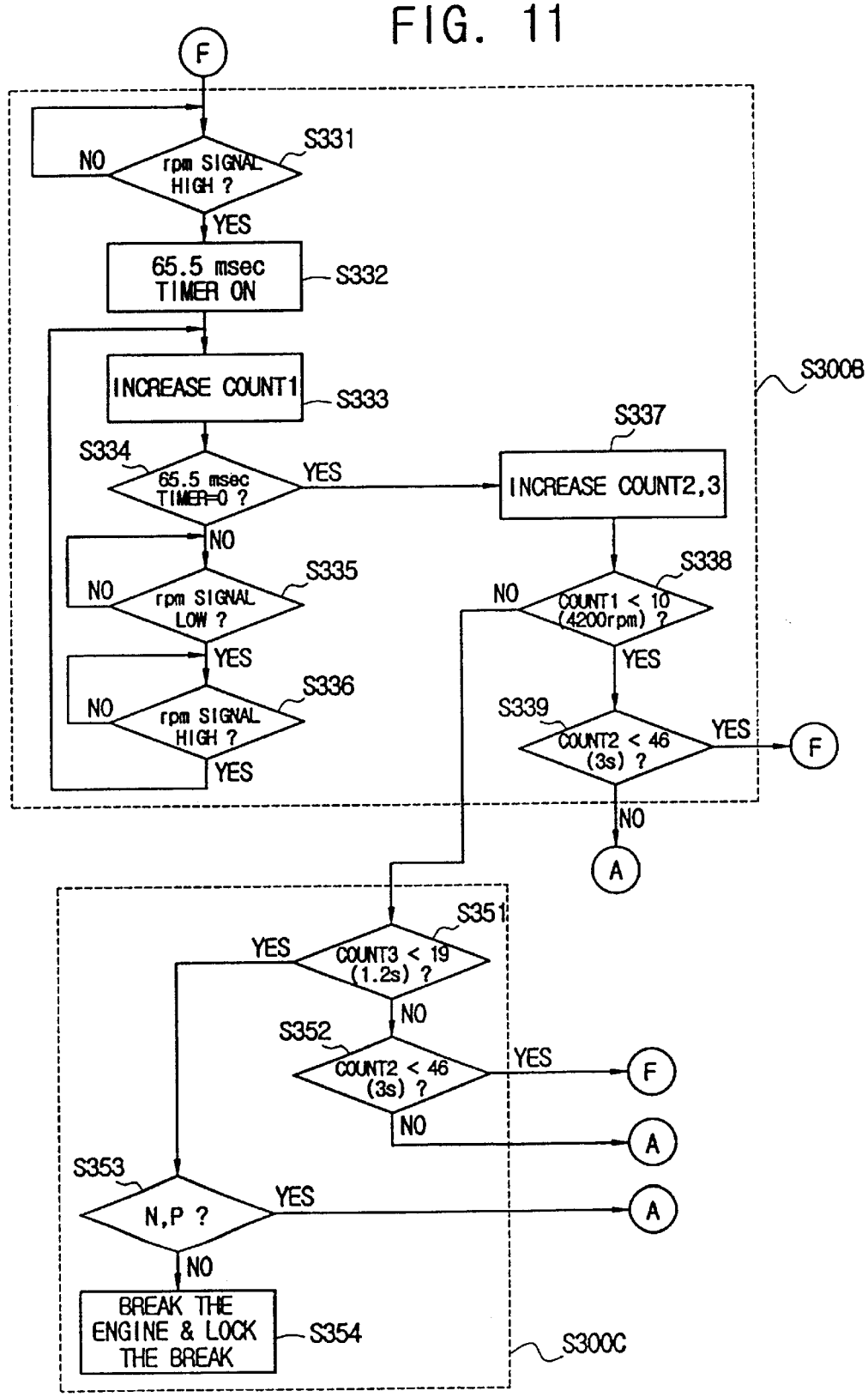

FIG. 10 and FIG. 11 show flow charts for illustrating the step S300. After the step S200 determines whether the transmission changes from N or P to D or R and releases the brake locked in the step S100A in case that the transmission changes to D or R, the step S300 executes steps of checking 2400 rpm S300A, checking 4200 rpm S300B, and locking the engine S300C.

The 2400 rpm checking step S300A checks 2400 rpm when the transmission is D or R. The step S300A is identical to the step S200A except that a second reference time previously set in the controller 60 for determining sudden acceleration when the transmission changes to a driving state such as D or R is 3 seconds, and therefore is not described in detail here. In the 2400 rpm checking step S300A, the counter COUNT2 counts a value for counting at 65.5 msec during 3 seconds (about 46).

The 4200 rpm checking step S300B is for checking 4200 rpm when the transmission is D or R. The 4200 rpm checking step is also identical to the 4200 rpm checking step S200B except that the second reference time is 3 seconds, and not described in detail.

The engine braking step S300C is executed when the value of the counter COUNT1 is not less than a value (10) corresponding to 4200 rpm. The step S300C includes steps of comparing the value of the counter COUNT3 with the third reference time S351, and comparing the value of the counter COUNT2 with the second reference time if the value of the counter COUNT3 is not less than the third reference time S352. If the value of the counter COUNT2 is not less than the second reference time, the step S350 proceeds to the step S400. If the value of the counter COUNT2 is less than the second reference time, the 4200 rpm checking step S300B is repeated.

In addition, if the value of the counter COUNT3 is less than the third reference time, the step S300C determines whether the transmission is N or P S353, then brakes the engine and locks the brake if the transmission is not N or P S354, and proceeds to step S400 if the transmission is N or P.

Figure 12:
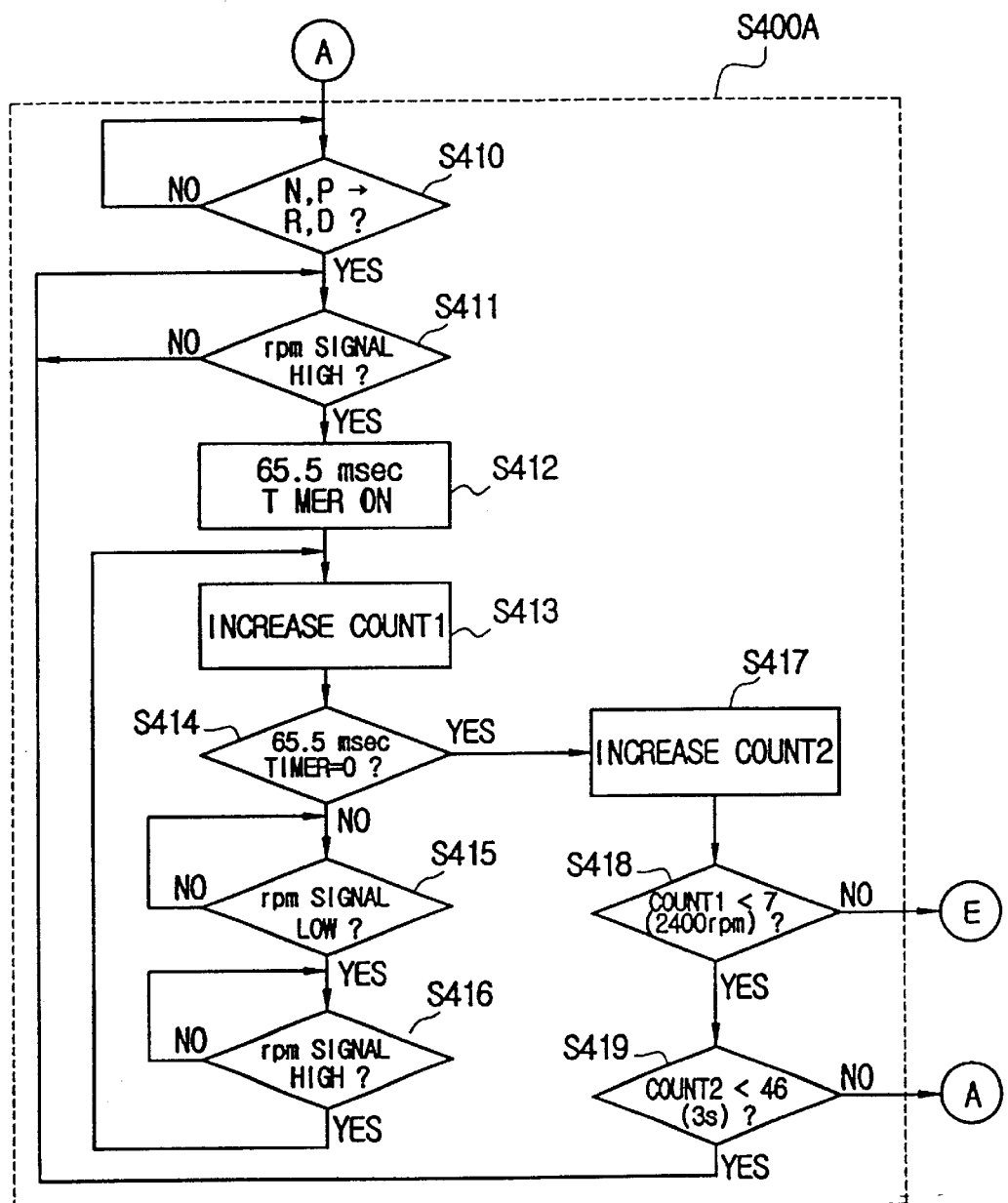
FIGS. 12 and 13 are detailed flowcharts for illustrating a control process when the transmission changes to D or R when a vehicle is driving.
Figure 13:
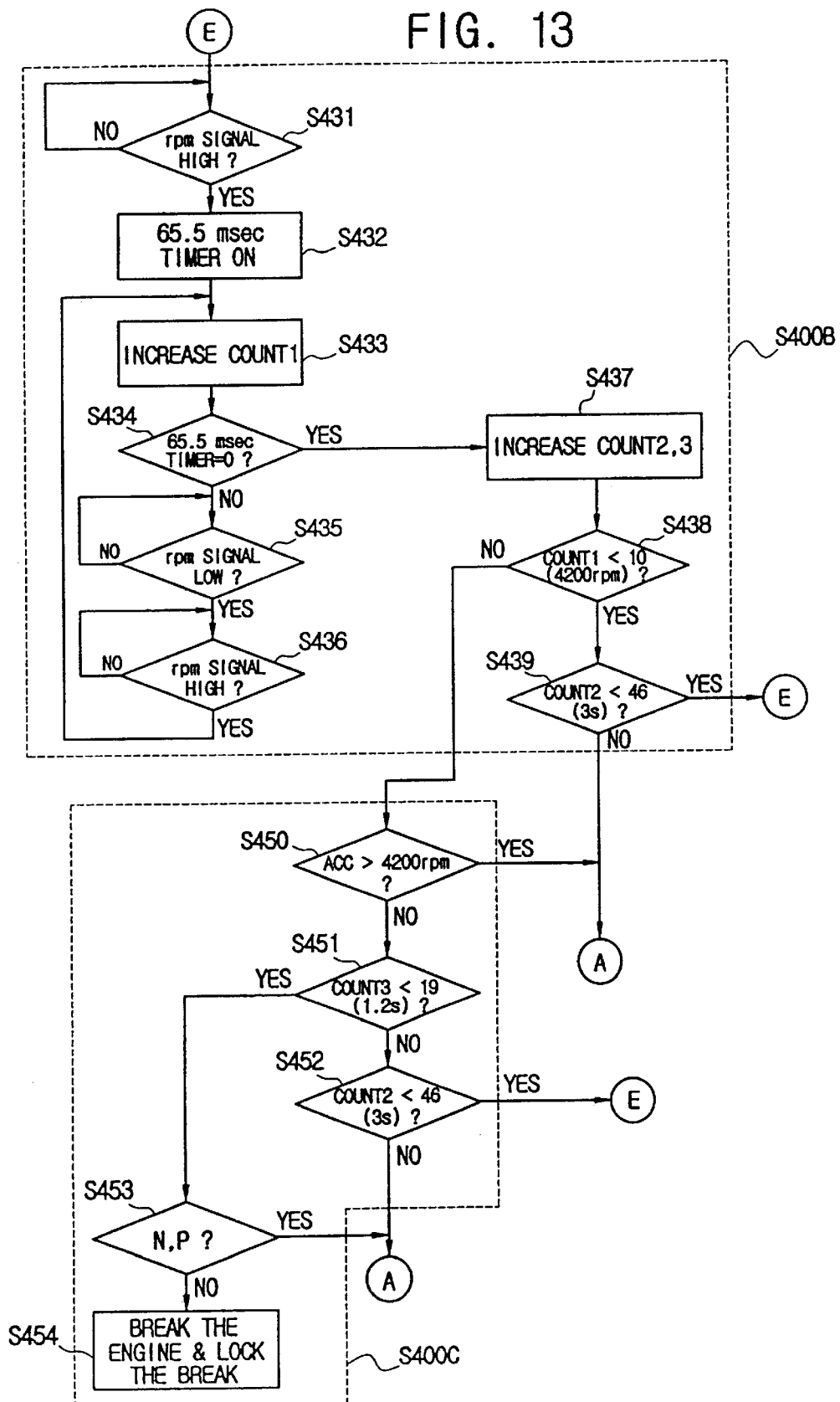

The controlling step when the transmission changes to D or R when driving the vehicle S400 is shown in FIG. 12 and FIG. 13. As shown in the figures, the step S400 includes steps of checking 2400 rpm S400A, checking 4200 rpm S400B, and braking the engine S400C, similar to the step S300.

The 2400 rpm checking step S400A checks whether the transmission changes from N or P to D or R S410, and executes same procedure as the step S300A if the transmission changes from N or P to D or R.

The 4200 rpm checking step S400B is identical to the 4200 rpm checking step S300B, and not described in detail. The engine braking step S400C includes a further step of determining whether the accelerator is pressed beyond a certain level in comparison with the engine braking step S300C. If the 4200 rpm checking step S400B determines that the value of the counter COUNT1 is not less than a value (10) corresponding to 4200 rpm, the step S400C determines whether the accelerator is pressed excessively than 4200 rpm, that is, output voltage of the ACC detecting unit 50 is not less than 1.0V S450. If the accelerator pedal is more pressed than 4200 rpm, the 2400 rpm checking step S400A is repeated. If the accelerator pedal is pressed not more than 4200 rpm, the step S400C executes same procedure as the engine braking step S300C.

Second Embodiment

Figure 14:
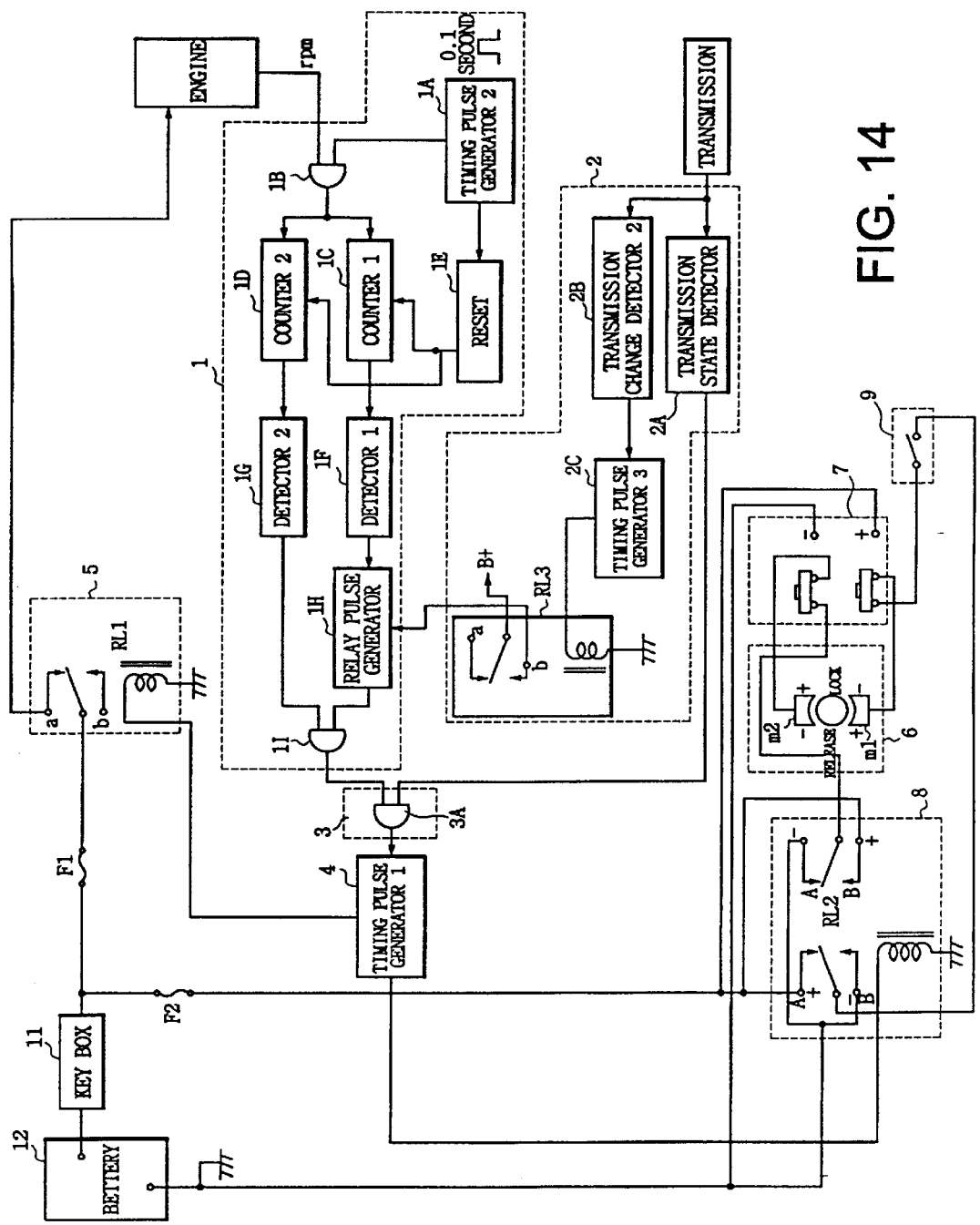
FIG. 14 shows a configuration of a sudden acceleration preventing apparatus according to another embodiment of the present invention.

FIG. 14 is a block diagram for showing configuration of a sudden acceleration preventing apparatus according to second embodiment of the present invention.

As shown in the figure, the apparatus according to the second embodiment includes a rpm detecting unit 1 for detecting engine driving and rpm for determining sudden acceleration, a transmission detecting unit 2 for detecting a present state of the transmission and detecting that the transmission changes from a stop state such as P or N to a driving state such as D or R, a sudden acceleration detecting unit 3 having an end gate 3A for detecting sudden acceleration by ending outputs of the rpm detecting unit 1 and the transmission detecting unit 2, and a first timing pulse generating unit 4 for generating timing pulses for a predetermined time (e.g. 3 seconds) according to output of the sudden acceleration detecting unit 3.

In addition, the apparatus includes an engine power blocking unit 5 having a relay RL1 for blocking power from a battery 12 toward the engine when the first timing pulse generating unit 4 generates a timing pulse. The relay RL1 includes a relay coil connected to the first timing pulse generating unit 4 and a relay switch connected to the battery 12 through a fuse F1 and a key box 11. The apparatus also includes a braking unit 6 for braking the vehicle when the first timing pulse generating unit 4 generates a timing pulse, a brake releasing unit 7 connected to the braking unit 6 and the battery 12 for releasing the braking unit 6 when the braking unit 6 operates abnormally due to an error of circuit, and a braking power supply unit 8 having a relay RL2 for supplying power to drive the braking unit 6 when the first timing pulse generating unit 4 generates a timing pulse. The relay RL2 has a relay coil connected to the first timing pulse generating unit 4 and a relay switch connected to the braking unit 6 and a sudden acceleration preventing unit 9 described below. The apparatus also includes the sudden acceleration preventing unit 9 connected to the relay RL2 and the brake releasing unit 7 for preventing sudden acceleration when driving the vehicle. The sudden acceleration preventing unit 9 has a button switch which is always OFF when the driver presses the accelerator pedal to a predetermined level. Preferably, the button switch is OFF when the rpm of the engine reaches at 4000 rpm. The button switch is attached to a back of the accelerator pedal.

The rpm detecting unit 1 includes a second timing pulse generating unit 1A for generating timing pulses for the purpose of counting rpm pulses, an end gate 1B for ending the detected rpm and output of the second timing pulse generating unit 1A, first and second counters 1C, 1D connected to output ends of the end gate 1B for counting the rpm generated when the timing pulse from the second timing pulse generating unit 1A is High, a reset unit 1E for resetting the first and second counters 1C, 1D at each rising edge of the timing pulse from the second timing pulse generating unit 1A, first and second detecting units 1F, 1G connected to the first and second counters 1C, 1D for detecting predetermined rpms (e.g. 600 rpm and 4200 rpm), a delay pulse generating unit 1H for delaying output of the first detecting unit 1F for a predetermined time (e.g. 2.5 seconds) in order to adjust timing of outputs of the first and second detecting units 1F, 1G, and an end gate 1I for ending outputs of the delay pulse generating unit 1H and the second detecting unit 1G.

The transmission detecting unit 2 includes a transmission state detecting unit 2A for detecting whether the transmission is D or R, a transmission change detecting unit 2B for detecting change of the transmission from P or N to D or R and outputs a signal when the transmission changes from P or N to D or R, a third timing pulse generating unit 2C for generating timing pulses for a predetermined time (e.g. 5 seconds) according to the signal from the transmission change detecting unit 2B, and a relay RL3 for supplying power to the delay pulse generating unit 1H by being switched according to output of the third timing pulse generating unit 2C.

Figure 15:
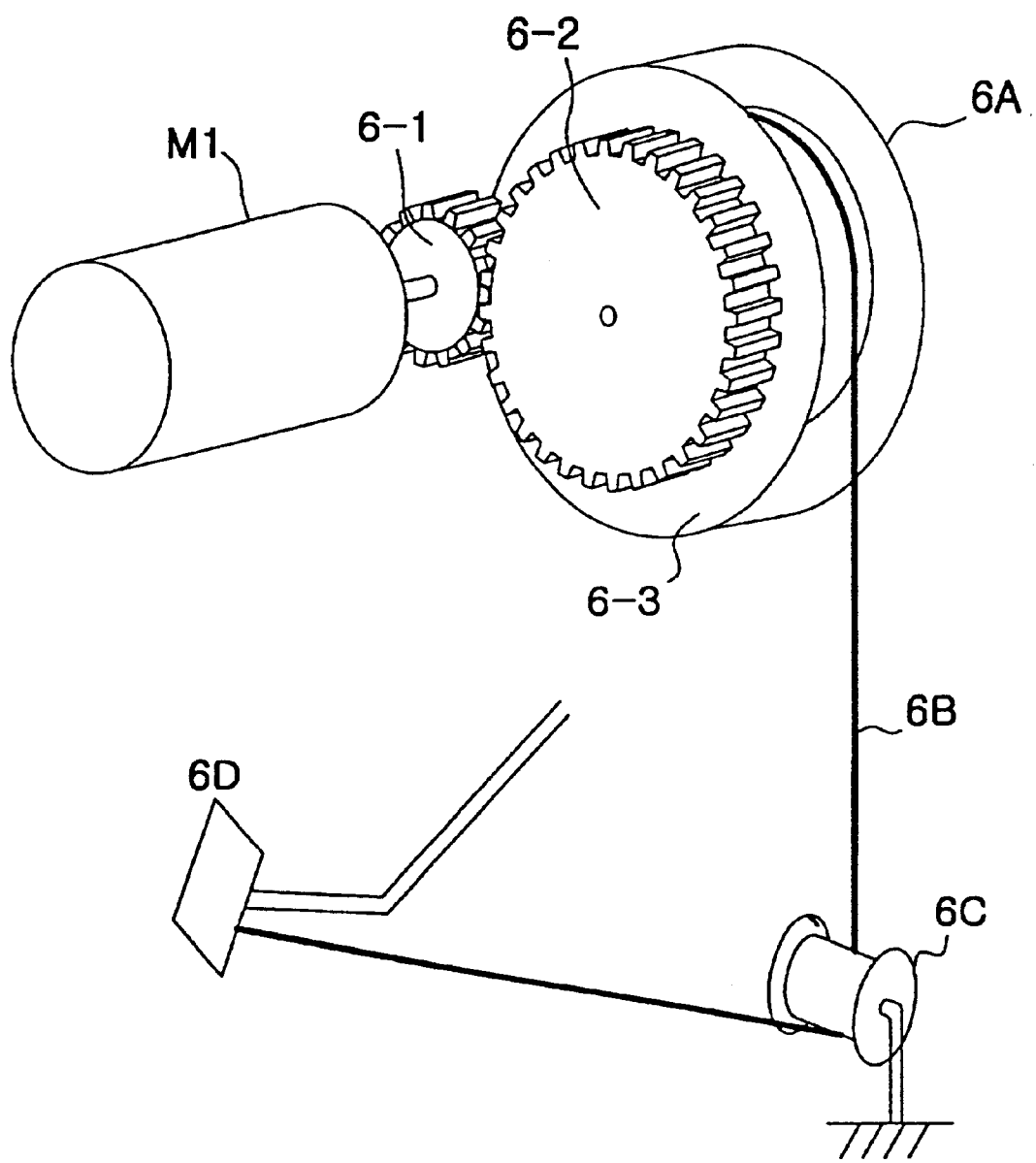
FIG. 15 shows a detailed configuration of a braking unit in FIG. 14.

The braking unit 6, as shown in FIG. 15, includes a motor M1 which operates only at the instant that polarity of the power supply changes, a steel wire 6B connected to the brake pedal 6D for being reeled around a rotating plate 6A connected to the motor M1 in order to brake the vehicle when the motor M1 drives, and a roller 6C fixed to a bottom of the body of the vehicle for reeling the steel wire 6B around the rotating plate 6A. In the braking unit 6, a small gear 6-1 mounted to a shaft of the motor M1 is engaged with a large gear 6-2 mounted to the rotating plate 6A such that the steel wire 6B may reel around the rotating plate 6A. At a certain position of the rotating plate 6A, a fixing pin 6-3 is provided for fixing one end of the steel wire 6B. In addition, a circumference of the rotating plate 6A is preferably 23 cm.

Referring to FIG. 14. again, the brake releasing unit 7 has a push button switch. The switch commonly gives connection at a left contact point such that the motor M1 may drive. If pressing the switch for 2–3 seconds, the switch gives connection at its right contact point in order to drive the motor M1 for releasing the brake unit. The relay RL2 has two relay switches for supplying+or −power from the battery 12 to stators m1, m2 of the motor M1.

In the second embodiment of the present invention as constructed above, the second timing pulse generating unit 1A generates a timing pulse of which High corresponds to 0.1 second. At this time, a period of the timing pulse is 0.2 seconds and may have variation. According to the timing pulse, the end gate 1B ends the detected rpm and the output of the second timing pulse generating unit 1A in order to count the rpm generated when the timing pulses from the first and second counters 1C, 1D are High.

The reset unit 1E resets the first and second counters 1C, 1D at each rising edge of the timing pulse from the second timing pulse generating unit 1A such that the first and second counters 1C, 1D may count rotating number of the engine only when the timing pulse is High.

Now, the reason why the second timing pulse generating unit 1A generates a timing pulse having High of 0.1 second is described.

3000 rpm means that an engine gives rotation of 3000 per 1 minute, which gives signals corresponding to 50 per 1 second and 5 per 0.1 second. Therefore, at 600 rpm, a reference signal of 1 is generated on the basis of 0.1 second, and a signal of 7 is generated at 4200 rpm in fact that the present invention detects the rpm on the basis of 0.1 second.

The first and second detecting units 1F, 1G detect 600 rpm and 4200 rpm. Detection of 600 rpm is for determining whether the engine drives which detection of 4200 rpm is for determining whether sudden acceleration occurs. In case of sudden acceleration, the rpm commonly increases as much as 3600 rpm (from 600 rpm to 4200 rpm), which is impossible by pressing the accelerator pedal. Therefore, because the signal of 7 is not detected in a normal condition, the present invention determines that sudden acceleration occurs if the rpm reaches 4200 rpm within a predetermined time. Such sudden acceleration may vary according to kind, manufacturing company, engine displacement or characteristics of a vehicle.

In addition, the output of the first detecting unit 1F is delayed through the delay pulse generating unit 1H for about 2.5 seconds, which makes timing of the output of the first detecting unit 1F adjusted with the output of the second detecting unit 1G. The outputs of the delay pulse generating unit and the second detecting unit 1H, 1G are ending at the end gate 1I. The end gate 1I outputs a High signal when the first and second detecting units detect 600 rpm and 4200 rpm respectively.

At this time, the delay pulse generating unit 1H for driving receives B+ power according to switching of the relay RL3. Such B+power supplying process to the delay pulse generating unit 1H is as follows.

At first, the transmission change detecting unit 2B detects that the transmission changes from P or N to D or R. If the transmission change detecting unit 2B detects that the transmission changes from P or N to D or R, the third timing pulse generating unit 2C generates pulses for a predetermined time (e.g. about 5 seconds) according to the output of the transmission detecting unit 2B.

Then, the relay RL3 switches from an A contact point to a B contact point, and therefore the delay pulse generating unit 1H receives the B+ power through the relay RL3. At this time, the third timing pulse generating unit 2C generates pulses only for a predetermined time (e.g. about 5 seconds) in order to prevent sudden acceleration only when initially starting the vehicle or restarting the vehicle after stopping. It is because sudden acceleration does not occur when the vehicle is driving.

The transmission state detecting unit 2A detects that the transmission is D or R, and then outputs a High signal when detecting D or R state. According to that, the end gate 3A outputs a High signal when the end gate 1I and the transmission state detecting unit 2A output the High signal such that the first timing pulse generating unit 4 may generate pulses for a predetermined time (e.g. about 3 seconds).

If the first timing pulse generating unit 4 generates the timing pulse, the relay RL1 of the engine power blocking unit 5 forms magnetic force due to current flowing on the relay coil, which makes the relay switch switches from the A contact point to the B contact point. Then, the relay RL1 blocks power supply from the battery toward engine such that the engine stops its operation.

At the same time, if the first timing pulse generating unit 4 generates the timing pulse, the two relay switches of the relay RL2 switches from A contact point to B contact point due to magnetic force flowing on the relay coil of the relay RL2. According to that, -power of the battery is applied to the lower stator m1 below a rotator of the motor M1 through the sudden acceleration preventing unit 9 and the brake releasing unit, while+power of the battery is applied to the upper stator m2 above the rotator of the motor M1. This changes the polarity of the power supplied to the motor M1.

Therefore, the small gear mounted to the shaft of the motor M1 rotates, and therefore the large gear engaged with the small gear rotates. Then, according to rotation of the large gear, the roller 6C rolls such that the steel wire 6B connected to the brake pedal 6D may be firmly reeled around the rotating plate 6A through the roller 6C in order to brake the vehicle. In the fact that the circumference of the rotating plate 6a is 23 cm and maximum depth to press the brake pedal 6D is at most 15 cm, rotation of the rotating plate 6A is not more than one cycle.

Because the first timing pulse generating unit 4 generates the pulses only for about 3 seconds, the braking state is released after 3 seconds automatically. In case that the braking state is not released due to an error in circuit, pushing the push button switch for 2–3 seconds makes the switch giving connection at its right contact point. Therefore, the motor M1 drives for releasing the brake. If laying a hand off the switch, the switch gives connection at an initial point, or a left contact point.

A method in case of restarting the vehicle after the vehicle is extinguished is identical to a prior starting method.

On the other hand, if sudden braking occurs due to malfunction of the sudden acceleration preventing apparatus during driving the vehicle at a high speed, it may cause an accident. Therefore, if the driver presses the accelerator pedal sufficiently, the apparatus determines that the driver demands high acceleration, and makes the push button switch of the sudden acceleration preventing unit 9 OFF in order not to supply power for braking to the motor M1, which may prevent sudden braking.

Definite numbers and times in the present invention as described above may vary according to kind of a vehicle, manufacturing company, vehicle displacement, vehicle characteristics, and so on, of course, and many variations and applications will be possible.

On the other hand, in another embodiment, the present invention may realize overall operations without the controller 60 if all functions of the controller 60 are programmed in a Central Processor Unit (CPU), which is a controller in an Engine Control Unit (ECU) of the vehicle. At this time, all operations of this embodiment are same as other embodiments except that the CPU in the ECU executes all functions of the controller 60, and will be not described.

As described above, the present invention may brake a vehicle by detecting sudden acceleration with use of transmission state and rpm value, so may prevent accident caused by the sudden acceleration for safe driving, and prevent sudden braking caused by malfunction of the sudden acceleration preventing apparatus when driving the vehicle at a high speed, which may cause tremendous accidents.

What is claimed is:

1. An apparatus for preventing sudden acceleration of a vehicle comprising:

start key input detecting means for detecting input of a start key;

rpm detecting means for detecting rpm;

transmission change detecting means for detecting change of a transmission;

ACC detecting means for detecting acceleration inputted through an accelerator pedal;

control means for recognizing inputs from the start key input detecting means, the rpm detecting means, the transmission change detecting means and the ACC detecting means, determining sudden acceleration as a result of the recognition, and then outputting an engine power blocking control signal for braking an engine and a brake locking/releasing control signal for locking/releasing a brake;

engine power blocking means for blocking power supply toward the engine according to the engine power blocking control signal from the control means; and brake locking means for locking/releasing a brake motor according to the brake locking/releasing control signal from the control means.

2. An apparatus as claimed in claim 1, wherein the control means determines sudden acceleration when the rpm is abruptly increased at an initial start within a first reference time in case that the transmission change detecting means does not detect a transmission change signal from N or P to D or R and the ACC detecting means detects that the inputted acceleration through the accelerator pedal is less than a reference voltage.

3. An apparatus as claimed in claim 1, wherein the control means determines sudden acceleration when the rpm is abruptly increased within a second reference time stored in the control means in case that the transmission change detecting means detects a transmission change signal from N or P to D or R after input of a start key.

4. An apparatus as claimed in claim 1, wherein the control means determines sudden acceleration according to the outputs from the rpm detecting means and the ACC detecting means when the transmission changes from N or P to D or R, and does not detect the rpm when the vehicle is driving.

5. An apparatus as claimed in claim 1, wherein the engine power blocking means comprises:

a switching transistor, turning ON according to the control signal from the control means; and a relay for blocking power supply toward the engine when the transistor turns ON.

6. An apparatus as claimed in claim 1, wherein the engine power blocking means comprises:
- a motor unit having a brake motor for braking the vehicle;
- a braking power supply unit for supplying power to the brake motor for locking the brake according to the brake locking control signal from the control means; and
- a brake releasing power supply unit for supplying power to the brake motor for releasing the brake according to the brake releasing control signal from the control means.

7. An apparatus as claimed in claim 6, wherein the brake motor is a reduction motor.

8. An apparatus as claimed in claim 6, wherein the motor unit has a steel wire connected to the acceleration pedal, the steel wire being reeled around a drum fixed to a shaft of the motor, through a roller fixed to a bottom of a body of the vehicle, in order to brake the vehicle.

9. An apparatus as claimed in claim 6, wherein the motor unit exerts braking force by pushing a hydraulic brake in the brake unit with use of a support member rotatably fixed to a body of the vehicle when the brake motor rotates clockwise, and exerts releasing force by drawing the hydraulic brake with use of the support member when the brake motor rotates counterclockwise.

10. An apparatus as claimed in claim 6, wherein the motor unit exerts braking or releasing force by pushing or drawing a hydraulic brake in the brake unit with use of a rod rotatably connected to a shaft of the brake motor, the rod being movable right/left according to clockwise or counterclockwise rotation of the brake motor.

11. An apparatus as claimed in claim 6, wherein the braking power supply unit comprises:
- a switching transistor, turning ON according to the brake locking control signal from the control means; and
- a relay for locking the brake motor by supplying power to the brake motor when the transistor turns ON.

12. An apparatus as claimed in claim 6, wherein the braking power supply unit comprises:
- a switching transistor, turning ON according to the brake locking control signal from the control means; and
- a relay for releasing the brake motor by supplying reverse power to the brake motor when the transistor turns ON.

13. A method of preventing sudden acceleration of a vehicle having an engine supplying drive power through a transmission comprising:
- first process of determining whether the transmission changes from a stop state to a driving state, determining that there is no sudden acceleration in case that rpm of the vehicle is not abruptly increased within a first reference time when the transmission is in the stop state, determining that there is sudden acceleration in a case where the rpm is abruptly increased with an input voltage of an accelerator under a reference voltage when the transmission is in the stop state, and locking a brake of the vehicle; and
- second process of determining sudden acceleration again and whether or not to lock the engine and the brake on consideration of a transmission state, an rpm and an acceleration input in a case where the first process determines that there is no sudden acceleration.

14. A method as claimed in claim 13, wherein the first process comprises the steps of:
- comparing first and second reference rpm reaching times with the first reference time when the transmission is in the stop state, the first reference rpm and the second reference rpm being set for determining sudden acceleration;
- proceeding to the second process in case that the first reference time is less than the first and second reference rpm reaching times, and determining whether the accelerator input voltage is less than the reference voltage in case that the first reference time is not less than the first and second reference rpm reaching times;
- proceeding to the second process in case that the accelerator input voltage is not less than the reference voltage, and comparing a rpm reaching time from the first reference rpm to the second reference rpm with a third reference time in case that the accelerator input voltage is less than the reference voltage;
- proceeding to the second process in case that the rpm reaching time from the first reference rpm to the second reference rpm is not less than the third reference time, and determining whether the transmission is in the stop state in case that the rpm reaching time from the first reference rpm to the second reference rpm is less than the third reference time; and
- proceeding to the second process in case that the transmission is in the stop state, and locking the engine and the brake in case that the vehicle is moving as a result of the determination.

15. A method as claimed in claim 13, wherein the second process comprises the steps of:
- determining whether the transmission changes from the stop state to the driving state, then comparing first and second reference rpm reaching times with a second reference time, the second reference time being set for determining sudden acceleration when the transmission changes from the stop state to the driving state, and then repeatedly checking change of the transmission in case that the second reference time is less than the first and second reference rpm reaching times;
- determining that an accelerator input voltage is less than a reference voltage for determining sudden acceleration in case that the second reference time is not less than the first and second reference rpm reaching times;
- proceeding to the first process in case that the acceleration input voltage is not less than the reference voltage, and comparing a rpm reaching time from the first reference rpm to the second reference rpm with a third reference time in case that the acceleration input voltage is less than the reference voltage;
- proceeding to the first process in case that the rpm reaching time from the first reference rpm to the second reference rpm is not less than the third reference time, and determining whether the transmission is in the stop state in case that the rpm reaching time from the first reference rpm to the second reference time is less than the third reference time; and
- proceeding to the first process in case that the transmission is in the stop state, and locking the engine and the brake in case that the transmission is not in the stop state.

16. A method as claimed in claim 13, further comprising third process of determining that there is sudden acceleration in case that the rpm is abruptly increased within a second reference time when the first process detects that the transmission changes from the stop state to the driving state, and then locking an engine and a brake.

17. A method as claimed in claim 16, wherein the third process comprises the steps of:

comparing first and second reference rpm reaching times with a second reference time for determining sudden acceleration;

determining that an acceleration input voltage is less than a reference voltage in case that the first and second reference rpm reaching times are not less than the second reference time;

comparing a rpm reaching time from the first reference rpm to the second reference rpm with a third reference time in case that the accelerator input voltage is less than the reference voltage, the third reference time being set for determining sudden acceleration when the rpm abruptly increases;

checking that the vehicle is moving in case that the rpm reaching time from the first reference rpm to the second reference rpm is less than the third reference time; and locking the engine and the brake in case that the vehicle is moving.

18. A method as claimed in claim 13, further comprising the steps of:

releasing the brake during changing the transmission from the stop state to the driving state in case that the brake is locked for shift lock at starting the vehicle; and proceeding to the second process after releasing the brake in case that the first process determines that there is no abrupt increase of the rpm within the first reference time.

19. A method for preventing sudden acceleration of a vehicle comprising:

first process of determining whether transmission of a vehicle changes from a stop state to a driving state after starting the vehicle;

second process of determining that there is no sudden acceleration in case that abrupt increase of rpm is not detected within a first reference time when the vehicle is in an initial stop state as a result of the determination of the first process, determining that there is sudden acceleration in case that the rpm abruptly increases when an accelerator input voltage is less than a reference voltage even in the stop state, and locking an engine and a brake; and third process of determining sudden acceleration in case that the rpm abruptly increases within a second reference time when the transmission changes from the stop state to the driving state, and locking the engine and the brake.

20. A method as claimed in claim 19, wherein the second process comprises the steps of:

comparing first and second reference rpm reaching times with the first reference time when the transmission is in the stop state;

determining whether the accelerator input voltage is less than the reference voltage in case that the first and second reference rpm reaching times are not less than the first reference time;

comparing a rpm reaching time from the first reference rpm to the second reference rpm with a third reference time in case that the acceleration input voltage is less than the reference voltage, the third reference time being set for determining sudden acceleration when the rpm abruptly increases;

determining whether the transmission is in the stop state in case that the rpm reaching time from the first reference rpm to the second reference rpm is less than the third reference time; and locking the engine and the brake in case that the transmission is not in the stop state.

21. A method as claimed in claim 19, wherein the third process comprises the steps of:

comparing first and second reference rpm reaching times with the second reference time;

determining an accelerator input voltage is less than a reference voltage in case that the first and second reference rpm reaching times are less than the second reference rpm;

comparing a rpm reaching time from the first reference rpm to the second reference rpm with a third reference time in case that the acceleration input voltage is less than the reference voltage, the third reference time being set for determining sudden acceleration when the rpm abruptly increases;

checking whether the transmission is in the stop state in case that the rpm reaching time from the first reference rpm to the second reference rpm is less than the third reference time; and locking the engine and the brake in case that the transmission is not in the stop state.

22. A method as claimed in claim 19, further comprising fourth process for determining sudden acceleration on consideration of a transmission state, a rpm and an acceleration input in case that the second process determines that there is no sudden acceleration, and then determining whether or not to lock the engine and the brake.

23. A method as claimed in claim 19, further comprising the steps of:

releasing the brake during changing the transmission from the stop state to the driving state in case that the brake is locked for shift lock after starting the vehicle, and proceeding to the third process; and releasing the brake for shift lock in case that the first process determines that there is no abrupt increase of the rpm within the first reference time.

24. A method for preventing sudden acceleration of a vehicle comprising:

first process of determining whether transmission of a vehicle changes from a stop state to a driving state after starting the vehicle;

second process of determining that there is no sudden acceleration in case that abrupt increase of rpm is not detected within a first reference time when the first process determines that the transmission is in an initial stop state, determining that there is sudden acceleration in case that the rpm abruptly increases when an accelerator input voltage is less than a reference voltage even in the stop state, and locking an engine and a brake;

third process of determining sudden acceleration in case that the rpm abruptly increases within a second reference time when the transmission changes from the stop state to the driving state, and locking the engine and the brake; and fourth process for determining sudden acceleration on consideration of a transmission state, a rpm and an acceleration input in case that the second process determines that there is no sudden acceleration, and then determining whether or not locking the engine and the brake.

25. A method as claimed in claim 24, further comprising the steps of:

releasing the brake during changing the transmission from the stop state to the driving state in case that the brake is locked for shift lock at starting the vehicle, and proceeding to the third process; and releasing the brake for shift lock in case that the first process determines that there is no abrupt increase of the rpm within the first reference time, and then proceeding to the fourth process.

26. An apparatus for preventing sudden acceleration of a vehicle comprising:

rpm detecting means for detecting rpm in order to determine drive of an engine and sudden acceleration;

transmission detecting means for detecting change of a transmission from a stop state to a driving state;

sudden acceleration detecting means for detecting sudden acceleration by using outputs of the rpm detecting means and the transmission detecting means;

first timing pulse generating means for generating timing pulse according to outputs of the sudden acceleration detecting means;

engine power blocking means for blocking power supply from a battery toward the engine according to a timing pulse from the first timing pulse generating means;

brake means for braking the vehicle according to the timing pulse from the first timing pulse generating means;

brake releasing means for releasing the braking means when the braking means operates abnormally;

braking power supply means for supplying braking power from a battery to the braking means according to the timing pulse from the first timing pulse generating means; and sudden braking preventing means connected to the braking power supply means and the brake releasing means in order to prevent sudden acceleration when the vehicle is driving.

27. An apparatus as claimed in claim 26, wherein the rpm detecting means comprises:

second timing pulse generating unit for generating a timing pulse for counting rpm pulses;

an end gate for ending outputs of the rpm detecting means and the second timing pulse generating unit;

first and second counters, each connected to an output end of the end gate for counting rpm pulses generated when the timing pulse from the second timing pulse generating unit is High;

a reset unit for resetting the first and second counter at each rising edge of the timing pulse from the second timing pulse generating unit;

first detecting unit connected to the first counter for detecting a predetermined rpm in order to determine whether the engine is driving or not;

second detecting unit connected to the second counter for detecting another predetermined rpm in order to determine sudden acceleration;

a delay pulse generating unit for delaying an output of the first detecting unit for a predetermined time in order to adjust timing of outputs of the first and second detecting units; and an end gate for ending outputs of the delay pulse generating unit and the second detecting unit.

28. An apparatus as claimed in claim 26, wherein the transmission detecting means comprises:

a transmission state detecting unit for detecting whether the transmission is in a driving state;

a transmission change detecting unit for detecting that the transmission changes from a stop state to the driving state;

third timing pulse generating unit for generating a timing pulse only during a predetermined time when the transmission change detecting unit detects change of the transmission; and a relay switching according to an output of the third timing pulse generating unit in order to supply driving power to the delay pulse generating unit.

29. An apparatus as claimed in claim 26, wherein the engine power blocking means comprises a relay in which a relay coil is connected to the first timing pulse generating means and a relay switch is connected to the battery through a fuse and a key box.

30. An apparatus as claimed in claim 26, wherein the braking means has a motor which operates only at the instant that polarity of the power supply changes, the braking means braking the vehicle by reeling a steel wire, connected to a brake pedal, around a rotating plate through a roller fixed to a bottom of a body of the vehicle when the motor drives for braking the vehicle.

31. An apparatus. as claimed in claim 30, wherein the rotating plate is a cylindrical rotating plate having a gear attached thereto.

32. An apparatus as claimed in claim 26, wherein the braking power supply means comprises a relay having a relay coil connected to the first timing pulse generating means and a relay switch connected to the braking means and the sudden acceleration preventing means, the relay supplying braking power from the battery to the braking means when the first timing pulse generating means generates a timing pulse.

33. An apparatus as claimed in one of the claims 1 to 12, wherein the control means is a central processor unit in an engine control unit of the vehicle.

34. An apparatus as claimed in claim 26, wherein the control means is a central processor unit in an engine control unit of the vehicle.

* * * * *